May 26, 1970  J. E. WHITFIELD  3,513,715

SPEED CHANGING MECHANISM

Filed Nov. 20, 1967  14 Sheets-Sheet 1

INVENTOR.
JOSEPH E. WHITFIELD
BY
ATTORNEY

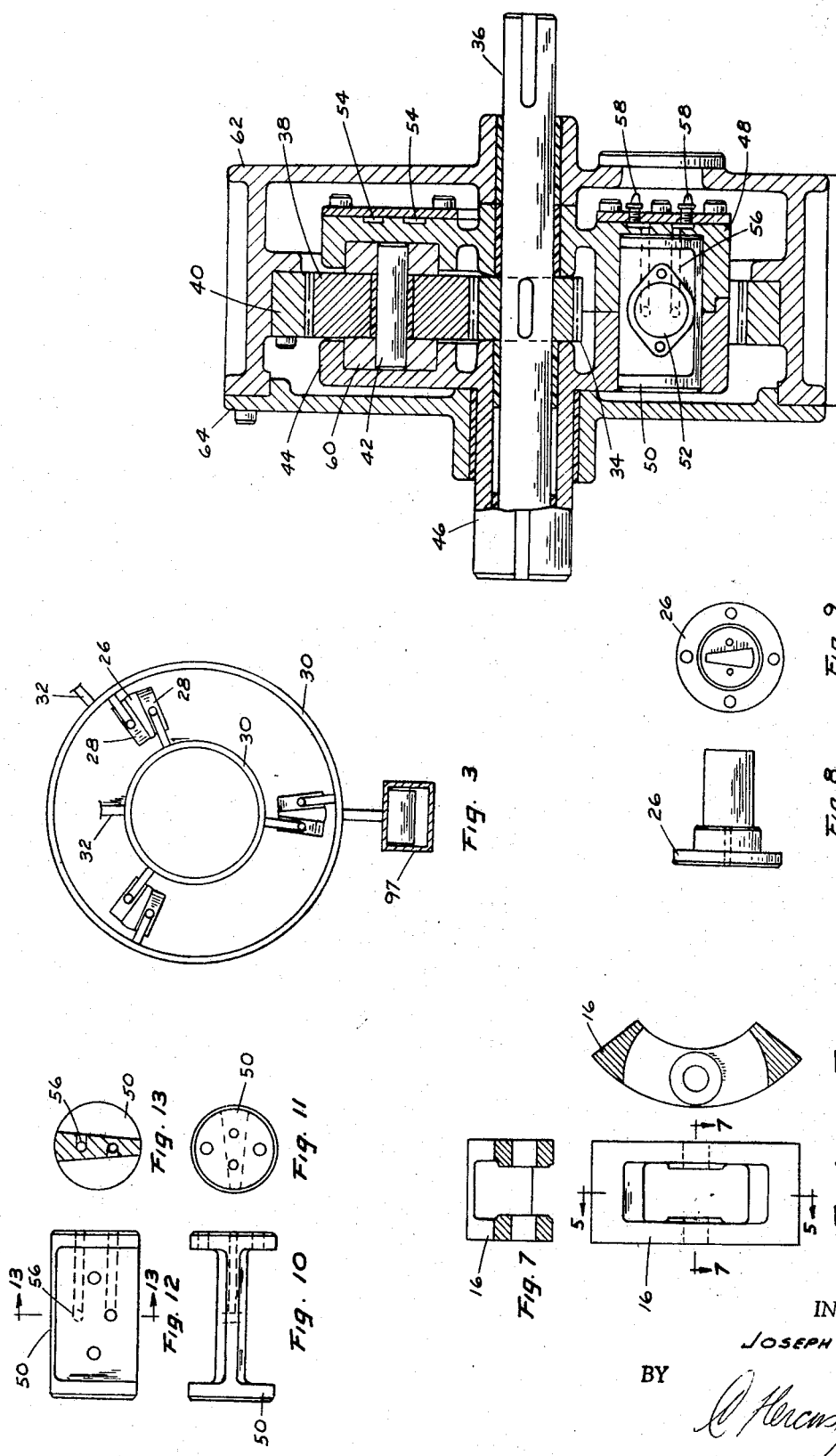

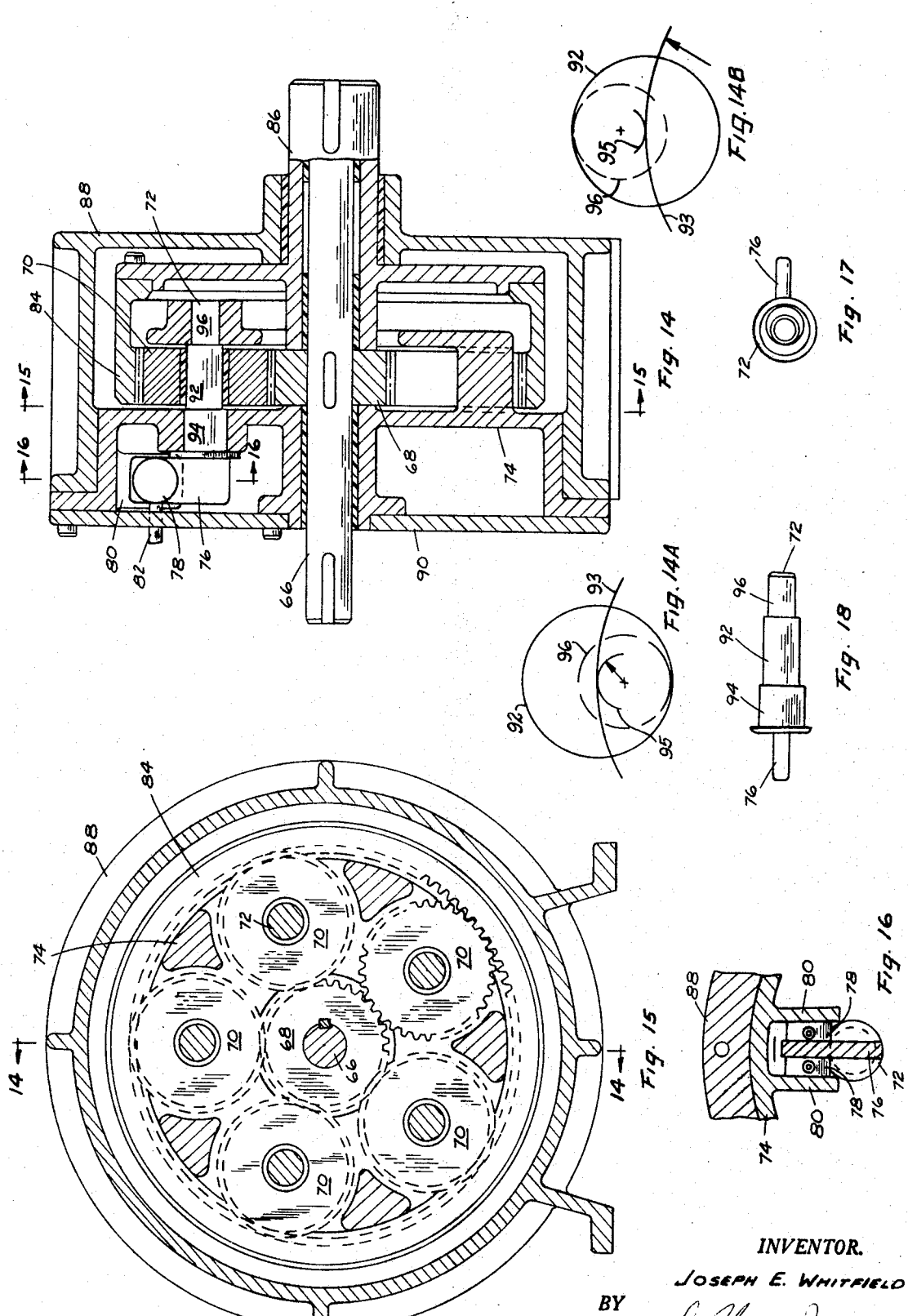

INVENTOR.
JOSEPH E. WHITFIELD
BY
ATTORNEY

May 26, 1970  J. E. WHITFIELD  3,513,715
SPEED CHANGING MECHANISM
Filed Nov. 20, 1967  14 Sheets-Sheet 5
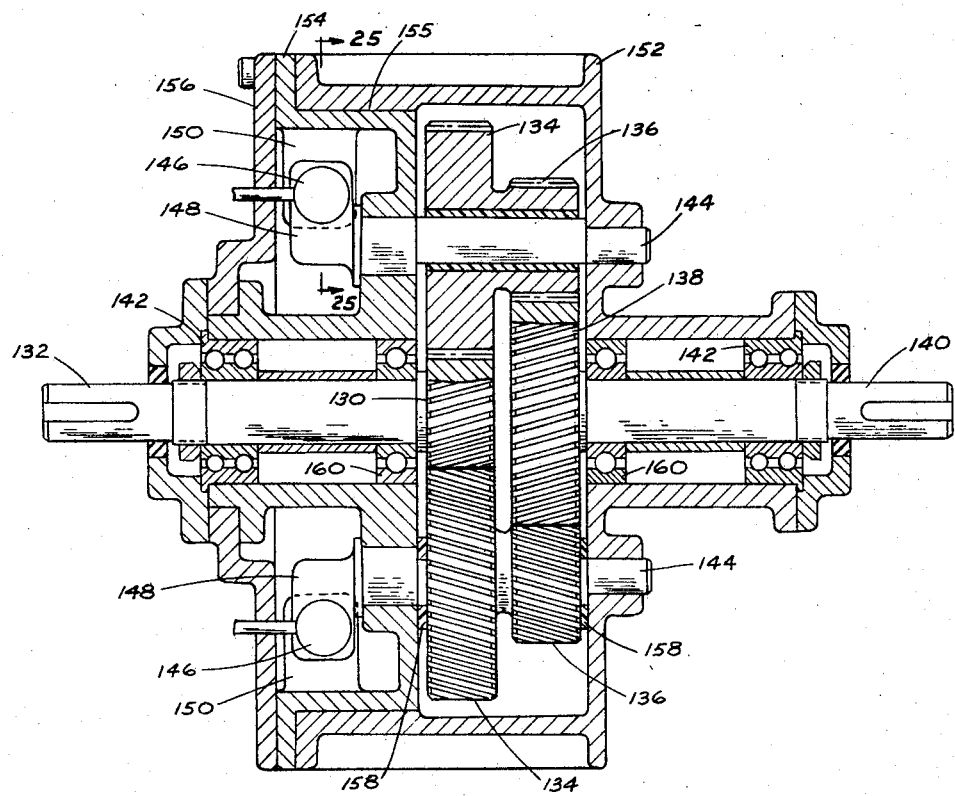
Fig. 24
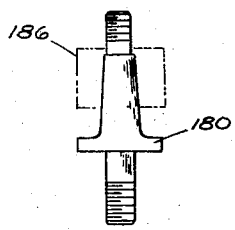
Fig. 30
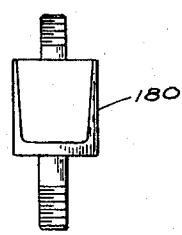
Fig. 29
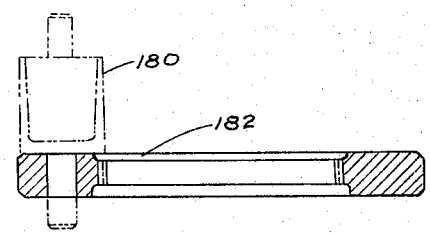
Fig. 28
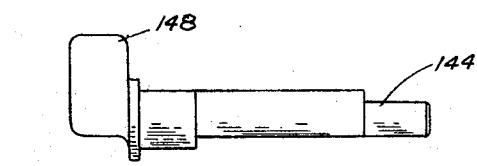
Fig. 26
Fig. 27
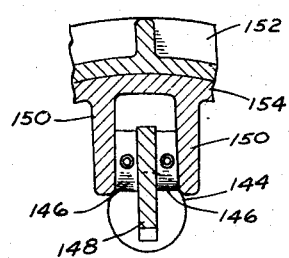
Fig. 25
INVENTOR.
JOSEPH E. WHITFIELD
BY
ATTORNEY

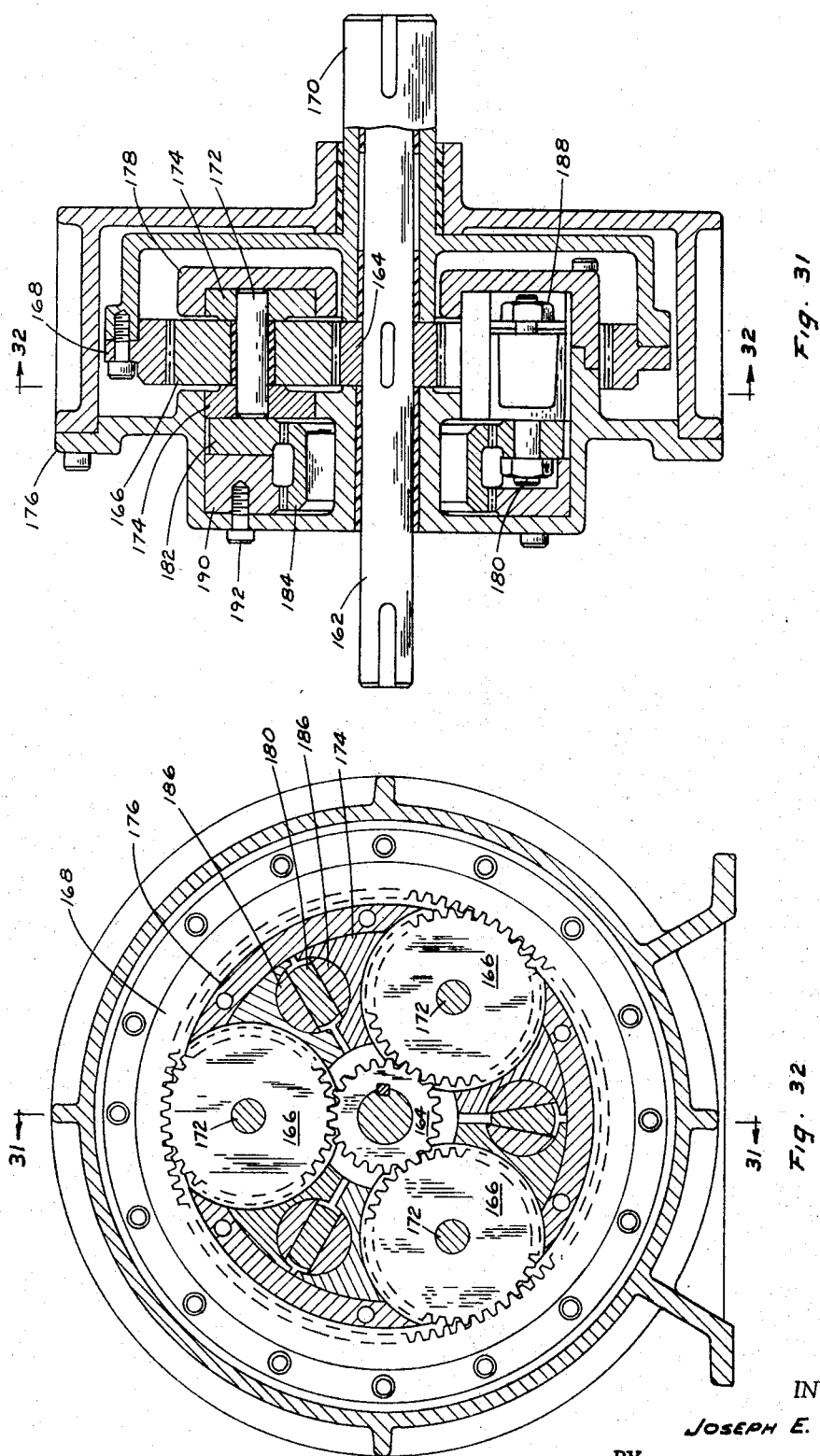

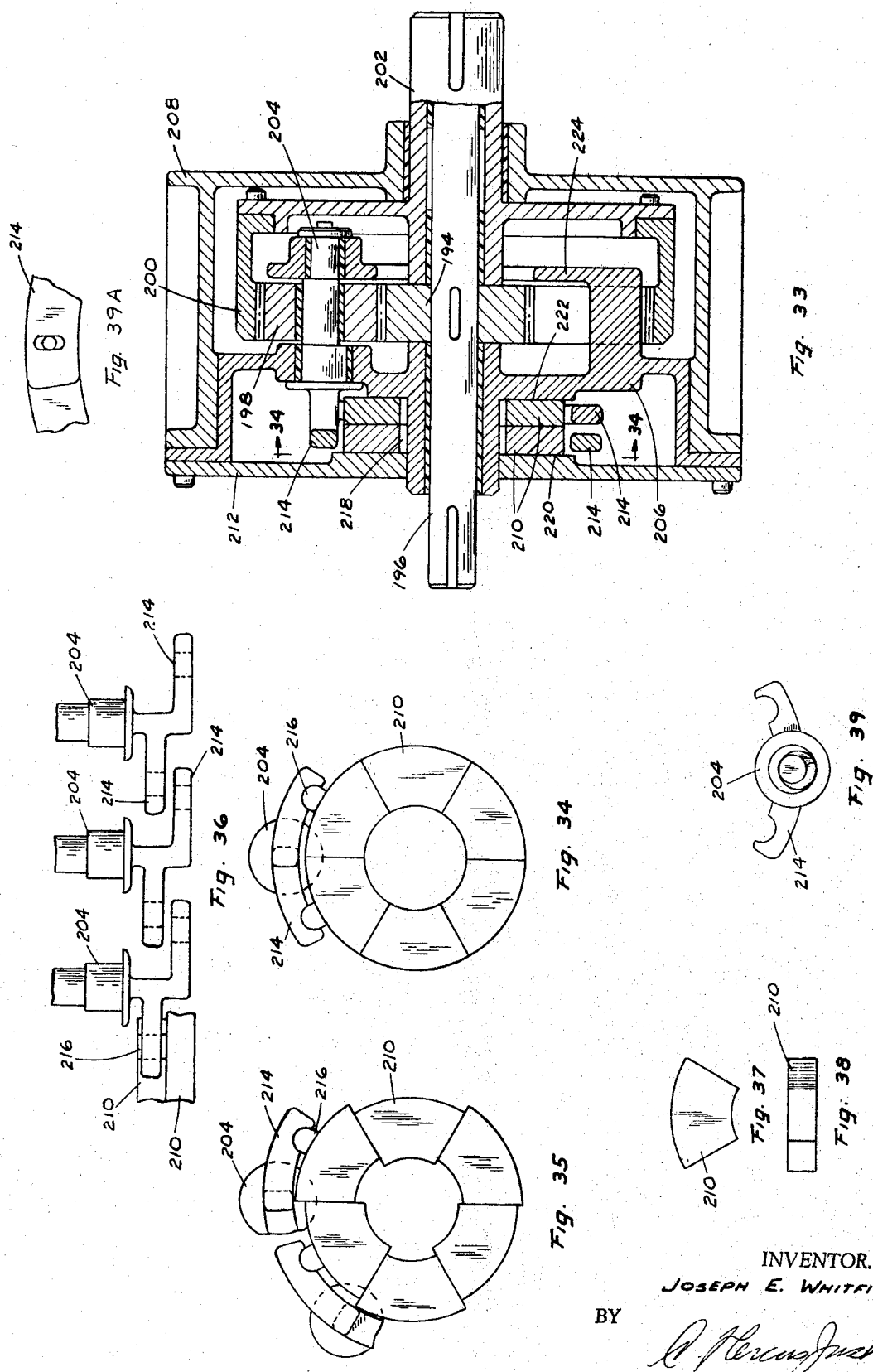

INVENTOR.
JOSEPH E. WHITFIELD
BY
ATTORNEY

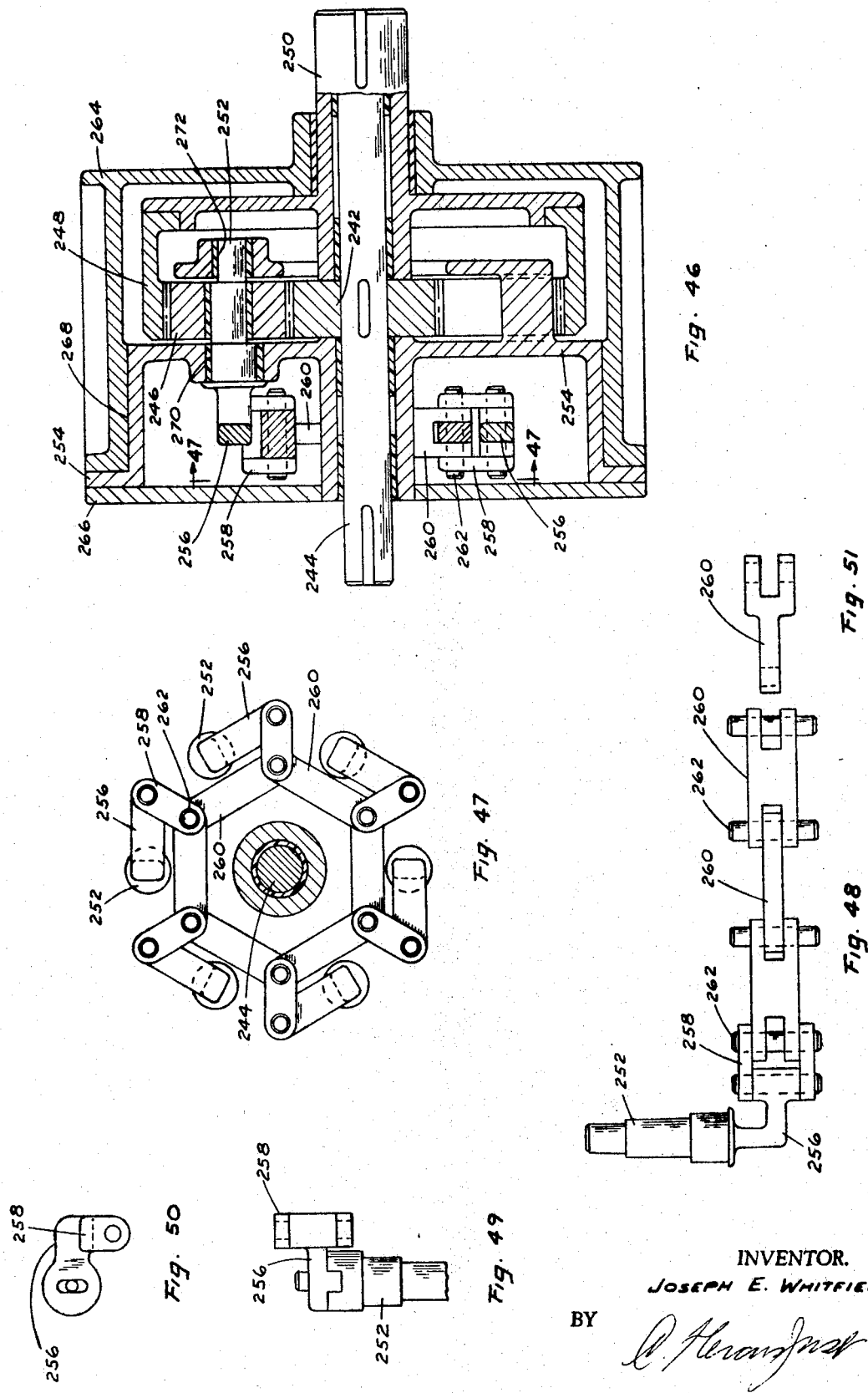

May 26, 1970 — J. E. WHITFIELD — 3,513,715
SPEED CHANGING MECHANISM
Filed Nov. 20, 1967 — 14 Sheets-Sheet 10
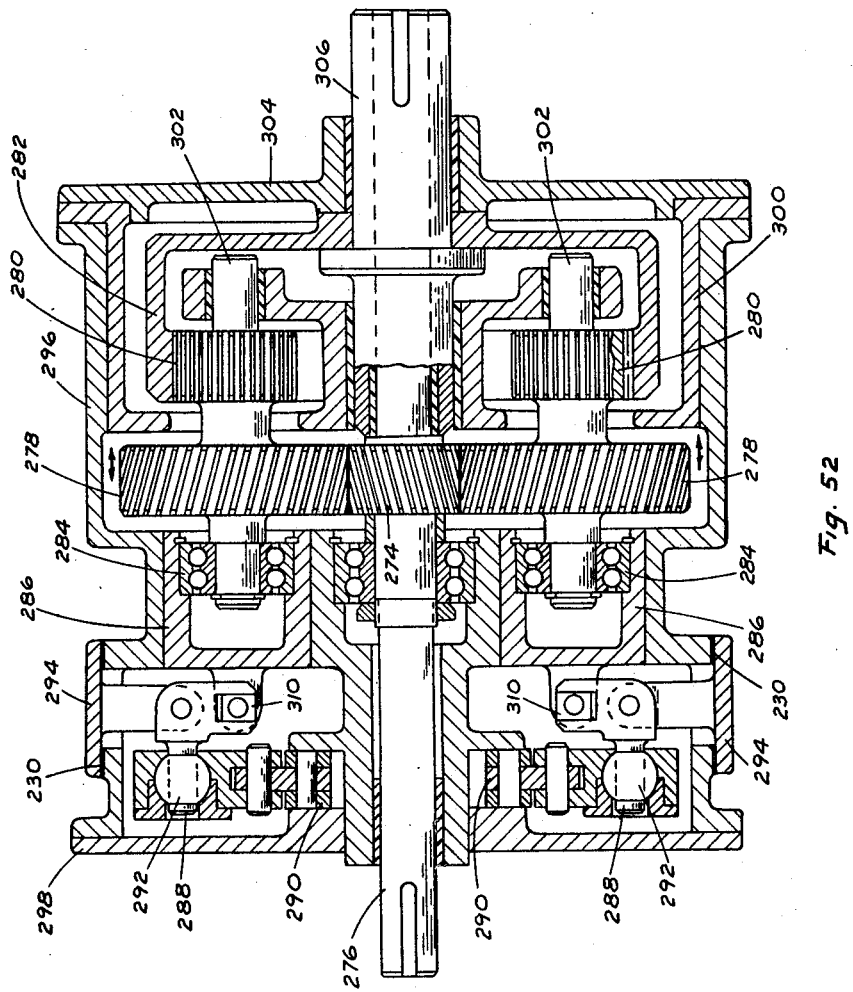
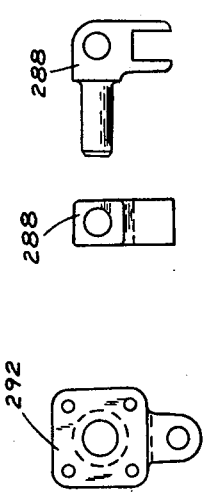
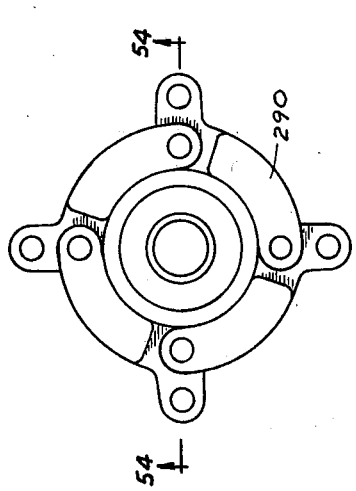
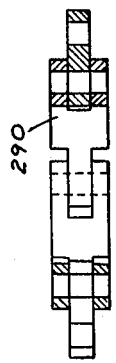
INVENTOR.
JOSEPH E. WHITFIELD
BY
ATTORNEY May 26, 1970     J. E. WHITFIELD     3,513,715

SPEED CHANGING MECHANISM

Filed Nov. 20, 1967     14 Sheets-Sheet 11

INVENTOR.
JOSEPH E. WHITFIELD

BY

ATTORNEY

INVENTOR
JOSEPH E. WHITFIELD

BY

ATTORNEY

May 26, 1970  J. E. WHITFIELD  3,513,715
SPEED CHANGING MECHANISM
Filed Nov. 20, 1967  14 Sheets-Sheet 13
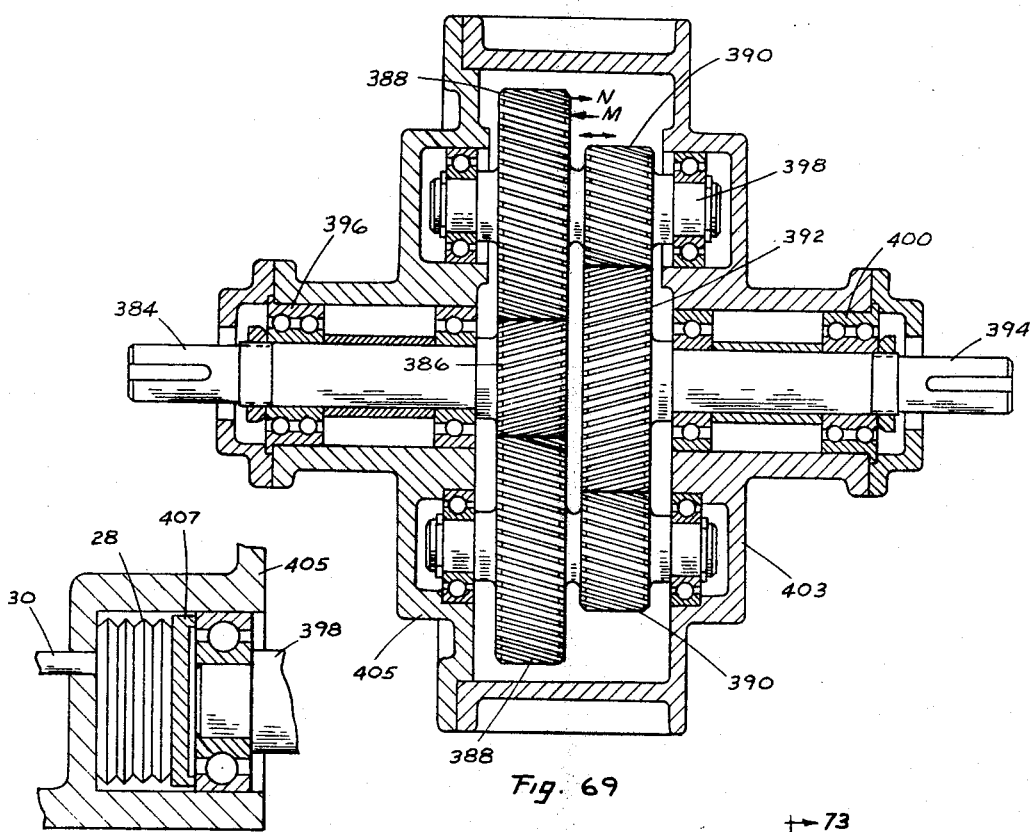
Fig. 69
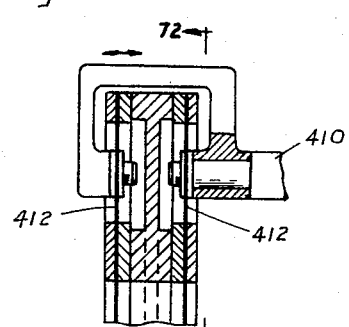
Fig. 69A
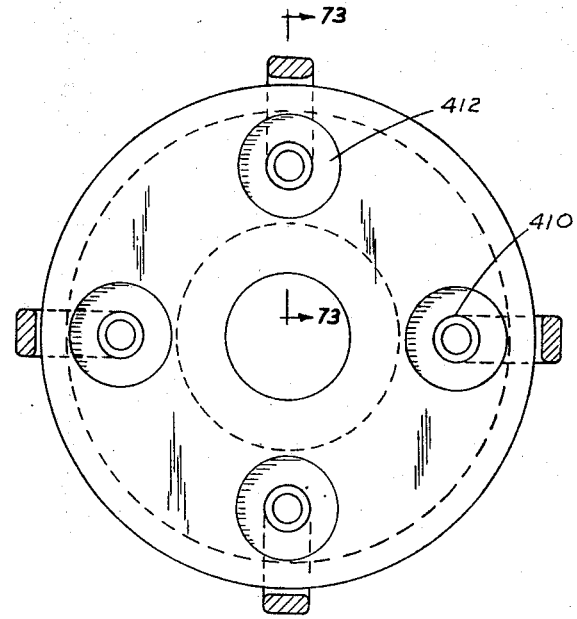
Fig. 73
Fig. 72
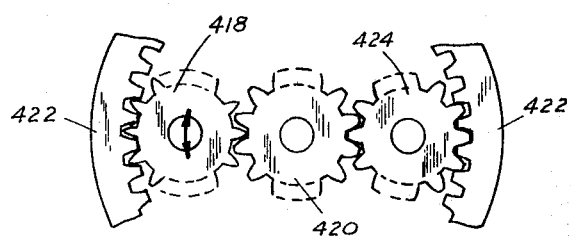
Fig. 77
INVENTOR.
JOSEPH E. WHITFIELD
BY
ATTORNEY May 26, 1970   J. E. WHITFIELD   3,513,715
SPEED CHANGING MECHANISM
Filed Nov. 20, 1967   14 Sheets-Sheet 14
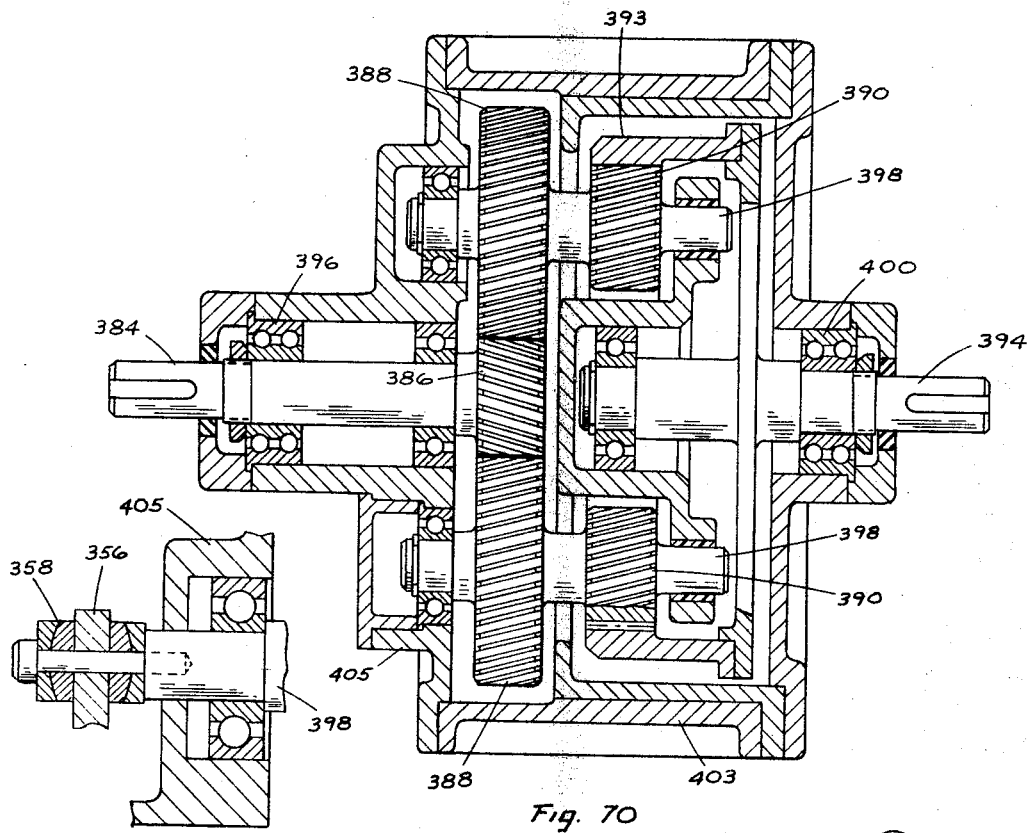
Fig. 70
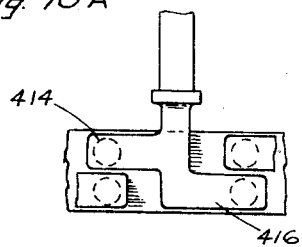
Fig. 70 A
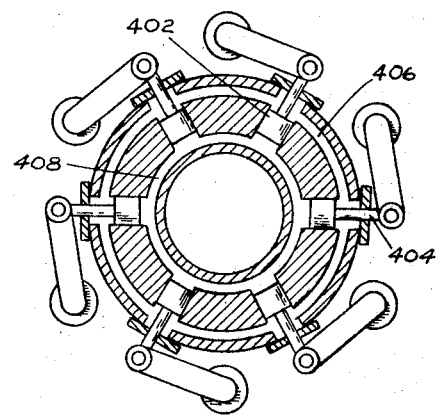
Fig. 71
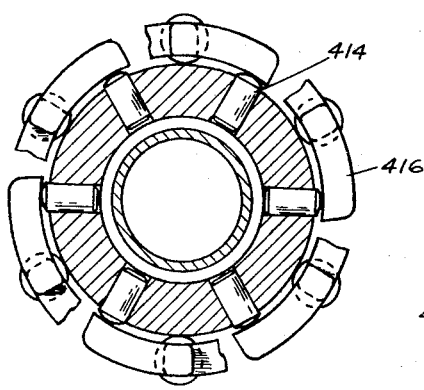
Fig. 74
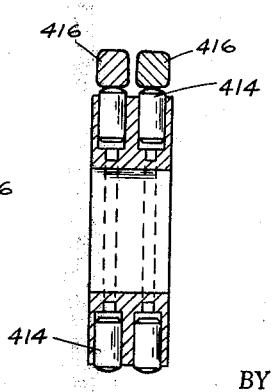
Fig. 75
Fig. 76
INVENTOR.
JOSEPH. E. WHITFIELD
BY
ATTORNEY United States Patent Office 3,513,715
Patented May 26, 1970

3,513,715
SPEED CHANGING MECHANISM
Joseph E. Whitfield, P.O. Box 325, Brockie Drive, York, Pa. 17405; National Bank and Trust Company of Central Pennsylvania, executor of said Joseph E. Whitfield, deceased
Filed Nov. 20, 1967, Ser. No. 684,333
Int. Cl. F16h 57/02
U.S. Cl. 74—410    24 Claims

ABSTRACT OF THE DISCLOSURE

Epicyclic gearing having either a sun or spur gear and coaxial internal gear with a plurality of planetary gears therebetween or compound gearing having two coaxial spur gears and compound outer gears connecting therebetween, and means to equalize the load upon all of the planetary and outer gears of either type by the employment of positive, non-flexible and/or incompressible elements or means which are arranged to equalize any positive or negative loads upon the various planetary and outer gears by positive shifting of the operative positions thereof automatically in directions to effect equalizing of the loads on all of said planetary or outer gears.

BACKGROUND OF THE INVENTION

In most of the equalizing systems now in use, flexible or compressible material is used in one of several forms to provide equalization. This is generally in the nature of a material which functions similarly to rubber and compresses or flows under load. Quite often metallic members are employed which are formed so they can bend or flex under load. Sometimes the entire gear mountings are intended to be flexible enough to provide equalization. Such designs can never truly equalize and they produce lost motion in fluctuating loads, and their flexibility can not be controlled or altered.

Various layouts of levers, bell cranks and slotted solid blocks or rigid annular rings are used. These usually require sliding motion with line or point contacts for bearing loads. Most of these devices will not equalize more than three gears. They are non-adjustable for backlash or wear and unsuitable for fluctuating loads. The angularity and working length of these various levers change with gear movement and therefore some equalization is lost. Most of these systems develop considerable lost motion upon reversal of rotation.

None of the known prior systems provide a separate balancing means for each direction of rotation and the forward equalization system can not be pre-loaded against the reverse load equalization system. Certain of the known hydraulic systems have pistons and cylinders which leak continuously and a pump must be provided to compensate for this leakage. Since there are relative moving parts in such a system, they also are subject to friction and wear.

Three planetary gears may quite easily be balanced mechanically. For example, a three-way balancing seesaw type device can be used as in Pats. Nos. 3,315,547, 3,315,-546 and 3,080,775. However, when it is attempted to balance four gears in the same manner, the problem becomes more difficult and many of the proposed solutions do not satisfactorily solve the problem. For example, in Pat. No. 3,292,460, especially FIG. 3, it is obvious such an arrangement will not equally balance the four gears under all conditions. Let it be assumed that two adjacent gears are in proper position to receive their share of the load, and the third gear is in position to receive more than its share of the load while the fourth gear is in a position to receive no load. To correct the situation the third gear must move in a negative direction and the fourth gear in a positive direction to provide equalization. The device shown can not accomplish such a movement.

Also, in the above-described arrangement, it must be assumed that one or more of the gears may require more movement of their centers than the other gears of a device to provide equal loading. This changes the angles and effective lengths of the various levers and links and thus the gear load is not truly balanced as in a hydraulic system. As another example, in the same patent, No. 3,292,460, in FIGS. 4 through 8, suppose one of the gear centers was not equally spaced by a relatively large amount. This would greatly change the working angle of the eccentric levers and the uneven angle of the eccentric levers would alter their effective working length and produce an unequal loading on the gear teeth. This is the equivalent of a balancing lever in which the central balancing point is not in the exact center of the lever.

Such an adverse condition can not develop with a hydraulic balancing system or any mechanical system that is exactly equivalent to a hydraulic system, as in the present disclosures. The tooth loads will be equal even when the gear spacing is considerably unequal.

SUMMARY OF THE INVENTION

This invention relates to improvements in speed changing devices having a predetermined speed ratio and embodying epicyclic gearing, as well as simple compound gearing that can be substituted for such epicyclic gearing, and balancing systems used in such mechanisms to insure even load distribution to all of the gears in the trains.

In epicyclic gearing having a single sun gear and a single internal gear, it is customary practice to use a multiplicity of planetary gears as driving means between the sun gear and internal gear. The input and output shafts are in axial alignment.

In the compound gearing used as a substitute for the epicyclic gearing the input and output shafts are also in axial alignment. Each of the two shafts have a gear of unequal size attached to their inner end. These gears will be termed spur gears. Multiple sets of gears, each set consisting of two gears of unequal size, are spaced around the central spur gears and these gears are termed outer gears. The drive between the unequal sized spur gears is through the mating complementary outer gears.

It should be apparent that although structural differences exist between the epicyclic planetary gear arrangement and the compound gear arrangement the results are similar. Several optional designs of substantially equivalent speed reducers are disclosed herein but they all have certain common features. A completely self-contained and sealed hydraulic system may be used with each of the various gear arrangements as the equalization means. In addition, optional mechanical means are provided which may be substituted for such hydraulic systems to achieve the desired results.

In regard to the gearing, two general arrangements are shown. One design has one sun gear, multiple planetary gears and an internal gear. A second design producing the same results has two spur gears, multiple compound spur gears and no internal gear. One spur gear serves the same purpose as an internal gear in the epicyclic planetary gear arrangement. All of the various equalization systems shown have certain common features. All are of rigid material or non-compressible substance, there being no dependence upon any kind of flexible or compressible material. All the systems have positive movement balanced against negative movement, as explained hereinafter, involving the principle of shifting of rigid mechanisms or non-compressible substances from a negatively loaded position to positively loaded position, in an equal degree, to provide a desired fixed speed ratio having no fluctuations or lost motion.

In the mechanical type balancing systems, the balancing forces are transferred equally, the same as in a hydraulic system, even when more than three planetary gears or outer gears are used. For example, in a centrally balanced seesaw, when one end is forced down by an unequal load the other end must go up an equal amount. The same is true of all these balancing devices except that three or more loads must be balanced and controlled equally.

When more than one planetary or outer gear is used in a speed changing mechanism, there is always the problem of dividing the load equally among them. There are many reasons for this problem. The various parts can be machined exactly correct. Material is somewhat elastic when under load and does not deflect equally. Due to heating, loading and aging, metal will gradually change dimensional slightly. Wear also occurs unequally.

The principal object of this invention is to provide a geared speed changing device employing planetary or outer gears having balanced tooth loading.

Another object is to provide various gear layouts with a sealed hydraulic balancing system.

Another object is to provide such a device with gears having self-adjustable centers, the centers moving partially in an orbital path around the sun gear.

Another object is to provide such a device with the planetary or outer gears mounted on eccentric shafts which are controlled by a sealed hydraulic system.

Another object is to provide such a device with compound gearing having no internal gear and controlled by sealed hydraulic means.

Another object is to utilize displaceable metal wedges in lieu of the displacement of liquid in the aforementioned hydraulic designs to effect the desired load equalization between the planetary or outer gears.

Another object is to utilize radially displaceable rigid metal links to effect the desired load equalization between the planetary or outer gears.

Another object is to utilize axially displaceable metal linkage to effect the desired load equalization between the planetary or outer gears.

Another object is to provide optional designs of equalization in which the equalizing effect is not diminished because of wear.

Another object is to provide a device with equalization means for planetary or outer gears that will compensate for inaccurately located gear centers.

Another object is to provide a device with equalization features that will compensate for undersize planetary or outer gears.

Another object is to provide such a device with equalization features for planetary or outer gears in which the same move axially to compensate for uneven gear loads.

Another object is to provide such a device having multiple gear sets, each set consisting of two gears, one gear of each set being helical and the other gear having straight teeth to provide equalization of loads upon the same.

Another object is to provide such a device having a plurality of sets of multiple gears, each set having two gears and both gears of each set being helical to provide equalization.

To simplify and clarify or define the language in the specification and claims, it is intended to term any movement or condition that tends to move a gear away from the load to reduce its load as being "negative" or a negative movement; likewise, any movement or condition that tends to move a gear into the load to increase its load as being "positive" or a positive movement. As an example, a gear set having four outer gears may have two of the gears located to carry exactly one-fourth of the load each while a third gear may be located to carry one-half of the total load and the fourth gear may be located to carry no load. To even the gear load the first two gears need not be shifted, the third gear should be shifted negatively to reduce its load and the fourth gear would be shifted in a positive direction to increase its load. This same sequence is true for any number of planetary or outer gears. If the balancing mechanism is correct, then the gears will be equally loaded because any gear that is overloaded will simply transfer part of its load to the underloaded gear or gears.

This invention provides for equal loading of all the planetary or outer gears in a simple, practical and economical manner, such even loading being maintained at all times regardless of slight errors in manufacturing, distortion due to load and normal wear, and any condition that tends to produce uneven loads.

There is no change in the gear ratio between the input and output shafts due to the slight shift in gear centers. The rotation lost by the negative movement of one or more gears is compensated for by the positive movement of one or more of the other gears. This is not possible when using flexible members as in certain prior devices.

In all the embodiments of this invention, there is a balancing action in which one or more of the gears is shifted in a positive direction to increase the load between when one or more of the other gears is shifted in a negative direction to reduce their load.

The underlying theory of all the embodiments disclosed is substantially exactly the same. For example, if a gear reducer has four or more planetary gears and each gear center is located and controlled by a hydraulic cylinder, then it would only be necessary to connect all these cylinders together and they would automatically balance each other precisely. However, due to leakage, it is necessary to employ a pump which is exterior to the system to compensate for this leakage. Accordingly, other designs are disclosed herein that perform similarly to hydraulic cylinders but are less complicated and have no leakage for which compensation must be made. Further, it is not essential that hydraulic fluid be used as a balancing means; any material or substance that can be displaced from one position to another may be used if the design is suitable for such use. Semi-solid fluids or dry pulverized materials may be used. Also, certain metal shapes can be displaced to transfer movement from one or more overloaded gears to one or more underloaded gears. In the following specification, hydraulic balancing systems are described for a plurality of different gear arrangements to illustrate the range of application of the invention. The systems which require hydraulic fluid may be filled at assembly and permanently sealed against leakage so as to constitute a self-contained unit or system not dependent upon exterior sources of supply or power means.

BRIEF DESCRIPTION OF THE DRAWINGS

FIG. 3 is a diagrammatic view of the hydraulic bellows and connections as used in FIGS. 1 and 2.

FIG. 4 is a longitudinal sectional view taken through the axis of a unit similar to FIG. 1 except herein the internal gear is stationary and the planetary gears are carried around the sun gear.

FIG. 5 is a cross-section through the planetary gear carrier taken on line 5—5 of FIG. 6.

FIG. 6 is a face view of the carrier.

FIG. 7 is another cross-section through the carrier shown in FIG. 6, on line 7—7 thereof.

FIG. 8 is a side view of the bellows support of the unit shown in FIGS. 1 and 2.

FIG. 9 is an end view of the support shown in FIG. 8.

FIG. 10 is an edge view of the bellows support as used in FIG. 4.

FIG. 11 is an outside end view of the support shown in FIG. 10.

FIG. 12 is a side view of the same support showing oil ports.

FIG. 13 is a cross-section taken on line 13—13 of FIG. 12 of the support and showing said oil ports herein.

FIG. 14 is a longitudinal sectional view taken through the axis of another embodiment of gear unit as seen on line 14—14 of FIG. 15.

FIG. 14A shows the centers of the end portions of the eccentric shafts being inside the circle formed by the centers of the planetary gears.

FIG. 14B shows the centers of the end portions of the eccentric shafts being outside the circle formed by the centers of the planetary gears. Both FIGS. 14A and 14B are shown out of regular scale for clarity.

FIG. 15 is a cross-sectional view taken on line 15—15 of FIG. 14.

FIG. 16 is a partial cross-sectional view taken on line 16—16 of FIG. 14 and showing the bellows for two-way operation.

FIG. 17 is an end view of the outer gear eccentric shafts for the unit of FIGS. 14 and 15 and showing a control arm thereon.

FIG. 18 is a side view of the eccentric shaft shown in FIG. 17.

FIG. 24 is a longitudinal sectional view of unit similar to that shown in FIG. 20 except that it illustrates a different balancing arrangement from that shown in FIG. 20.

FIG. 25 is a fragmentary sectional view of the bellows arrangement as taken on line 25—25 of FIG. 24.

FIG. 26 is a side view of the eccentric shaft of FIG. 24 showing a control arm thereon.

FIG. 27 is another side view of the eccentric shaft of FIG. 24 showing an edge view of the control arm.

FIG. 28 is a sectional view of one-half of a gear coupling used in the embodiment of gear unit shown in FIG. 31 and having a drive pin indicated thereon in phantom.

FIG. 29 is a side view of the drive pin shown in FIGS. 31 and 32.

FIG. 30 is an edge view of the drive pin shown in FIGS. 31 and 32.

FIG. 31 is a longitudinal sectional view of still another embodiment of gear unit as seen on line 31—31 of FIG. 32, said embodiment being similar to FIG. 1 except the balancing mechanism is mechanical instead of hydraulic.

FIG. 32 is a cross-sectional view of the unit shown in FIG. 31 taken on line 32—32 of FIG. 31.

FIG. 33 is a longitudinal sectional view of still another embodiment of gear unit and is similar to that shown in FIG. 14 except that a mechanical means of equalization is shown instead of a hydraulic bellows system.

FIG. 34 is a side view of the assembled balancing wedges per se as seen on line 34—34 of FIG. 33, but only one eccentric shaft with its two control arms being shown in position with said assembly.

FIG. 35 is a view similar to FIG. 34 except that the wedges are shown in an uneven position, as is possible during operation and showing two control shafts with control arms partly broken away for clarity.

FIG. 36 is a plan view of a plurality of the control arms on the eccentric shafts in association with a pair of wedges illustrated fragmentarily.

FIG. 37 is a side view of a wedge per se of the type shown in FIGS. 33 to 36.

FIG. 38 is an end view of such wedge.

FIG. 39 is an end view of an eccentric shaft per se and its two control arms for the unit of FIGS. 33 to 36.

FIG. 39A shows a control arm similar to those in FIG. 39 but provided with wear adjustment means.

FIG. 46 is a longitudinal sectional view of a still further embodiment of gear unit somewhat similar to that shown in FIG. 14 except that a linkage mechanism is used for equalization instead of the hydraulic bellows shown in FIG. 14.

FIG. 47 is a side view of the linkage seen on line 47—47 of FIG. 46.

FIG. 48 is a plan view of the linkage of FIG. 47 opened out flat and connected to one eccentric shaft.

FIG. 49 is a fragmentary side view of an eccentric shaft with an adjustable control arm.

FIG. 50 is an end view of the adjustable control arm shown in FIG. 49.

FIG. 51 is a plan view of a half link that is necessary when an odd number of planetary gears are used.

FIG. 52 is a longitudinal sectional view through a still further embodiment of gear unit somewhat similar to that shown in FIG. 40 except an internal gear system is used and links are employed for load equalization control.

FIG. 53 is a side view of the assembly of links only of the unit shown in FIG. 52.

FIG. 54 is a sectional view of the links as seen on lines 54—54.

FIG. 55 is a side view of the equalization bell crank of the unit shown in FIG. 52.

FIG. 56 is an end view of the bell crank shown in FIG. 55.

FIG. 57 is a side view of the self-aligning joint for the bell crank as shown in FIG. 52.

FIG. 69 is a longitudinal sectional view through a still further embodiment of gear unit somewhat similar to that shown in FIG. 40.

FIG. 69A is an enlarged elevation of one end of an outer gear shaft provided with hydraulic bellows means to achieve equalization when the outer gears themselves are slightly unequal.

FIG. 70 is a longitudinal sectional view through a device similar to that of FIG. 69 except that one spur gear and one internal gear are used instead of two spur gears as in the unit of FIG. 69.

FIG. 70A shows the wobble plate of FIG. 62 used in connection with the gears of FIGS. 69 and 70.

FIG. 71 is a diagrammatic sectional view of a hydraulic balancing means which may be substituted for the mechanical links shown in FIGS. 47–48 for the unit illustrated in FIG. 46.

FIG. 72 is a side view of a hydraulic balancing device which may be substituted for the mechanical balancing devices shown in FIGS. 62, 64 and 66.

FIG. 73 is a fragmentary sectional view of the hydraulic device shown in FIG. 72.

FIG. 74 is a hydraulic balancing device which may be substituted for the balancing wedges shown in FIGS. 33 and 40.

FIG. 75 is a cross-sectional view of the device shown in FIG. 74.

FIG. 76 is a fragmentary exterior view of the hydraulic device shown in FIG. 74 and illustrates one eccentric shaft and the two control arms thereon.

FIG. 77 shows the manner of operation of an undersize gear in a planetary gear train.

Figure 1:
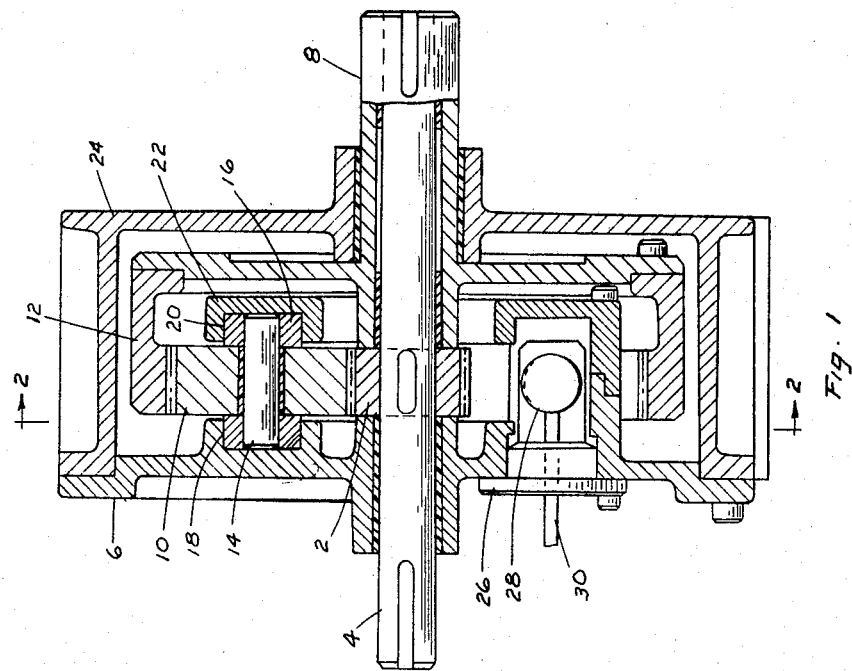
FIG. 1 is a longitudinal sectional view taken on line 1—1 of FIG. 2 and showing an internal gear that revolves.

It is to be observed from the following description of the various embodiments of the invention that they have in common the following beneficial attributes and characteristics which distinguish them over the known prior art:

(1) All load-carrying engagements in the balancing systems provide for relatively large two-dimensional surface area wearing surfaces which makes them superior to known, less desirable, but operable designs.

(2) All the balancing systems are manually and/or self-adjustable for zero clearance at assembly and are manually or self-adjustable to compensate for wear.

(3) All the optional gear design layouts are illustrated and described as having a sealed hydraulic balancing system; and for each of these hydraulic balancing systems there is provided a mechanical balancing system to produce substantially the same results in the same space and in substantially the same manner.

(4) In all the balancing arrangements disclosed, the balancing pressure remains constantly equal even when a relatively large movement of one or more gears is required to effect balance of the gears.

(5) In all the designs disclosed, none of the planetary or outer gears can carry any load until all the gears are equally loaded.

(6) In all the designs disclosed, all lost motion can be eliminated from the valancing system and there will be no backlash when driving a fluctuating load.

(7) No lost motion occurs when the unit is reversed.

(8) All the embodiments and designs, except a simplified version of one of the major designs, can be used with more than three planetary or outer gears and maintain theoretically perfect equalization.

In all these disclosures either a double acting single system or single acting double system of equalization is used and this provides for the pre-loading of the system for forward rotation against reverse rotation to eliminate all backlash.

DESCRIPTION OF THE PREFERRED EMBODIMENTS

To simplify the descriptions, longitudinal sectional views of a limited number of optional designs having hydraulic balancing systems are shown first in the drawings and described first in the specification. These are FIGS. 1, 4, 14, 20 and 24. The remainder of the designs shown all have mechanical equalization means as optional designs for the hydraulic systems.

The speed changing devices described herein have been termed speed reducers throughout the specification and claims for purposes of simplicity. However, it is to be understood that all of these designs may be used as speed increasers. When used as speed increasers the shafts designated as input shafts become the output shafts and the designated output shafts become the input shafts. In a few other instances, other slight changes may be necessary in the description but this will be understood by those skilled in the art.

Referring to FIG. 1, the sun gear 2 is fixed to the input shaft 4, one end of shaft 4 being journaled in the housing end wall 6 while the other end of the shaft is journaled in the hollow output shaft 8. The sun gear 2 meshes with the outer gears 10 and these mesh with the internal gear 12. The internal gear 12 is fixed to and concentric with the output shaft 8. The gears 10 are rotatable on the shafts 14 and the shafts 14 are journaled in the carriers 16. The carriers 16 are arcuate on their outside and inside surfaces and are free to slide in the circular guideways 18–20, the guideway 18 being in the end wall 6 and the guideway 20 being in the circular support 22. The housing 24 and the end wall 6 complete the outside structure and carry the bearings for the shafts 4 and 8.

It will be obvious from the foregoing that if the sun gear is the input or driving gear, the internal gear 12 will be the driven gear, and vice versa. Therefore, for convenience, in the following description relative to FIGS. 1 and 2, as well as in the descriptions hereinafter concerning the other succeeding figures, and also in the appended claims, the driving and driven gears shall be referred to commonly as drive gears.

Figure 2:
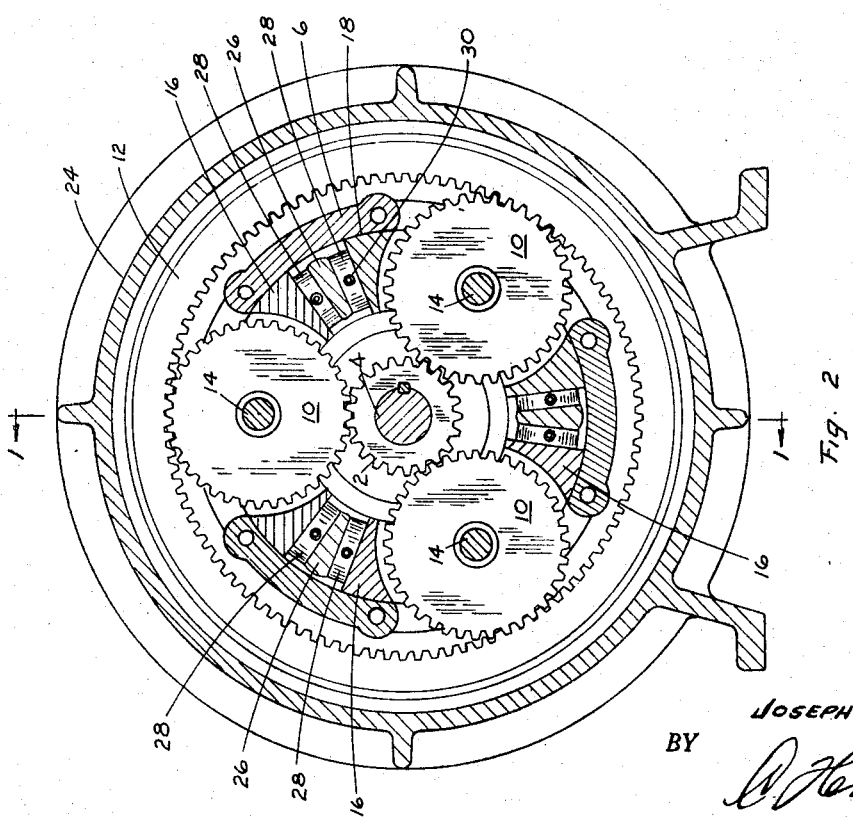
FIG. 2 is a cross-section taken through FIG. 1 on line 2—2.

In FIG. 2, the carriers 16 are shown as being located in the circular guideway 18. A bellows support 26 is rigidly fixed in the guideways between the ends of the carriers 16. A bellows 28 is placed between each end of the carriers 16 and the bellows support 26 to control the movement of the carriers 16 and their gears 10. The bellows 28 are connected as shown in FIG. 3 by the tubing 30. One set of bellows is required for each direction of rotation. The bellows 28 are filled and sealed after assembly, and the planetary gears 10 are properly located thereby.

In operation, the input shaft 4 turns the sun gear 2 and the sun gear rotates the gears 10 about their slightly shiftable axis. The gears 10 rotate the internal gear 12 at a reduced speed and in the opposite direction of the input shaft. The internal gear 12 is fixed to and rotates the output shaft 8.

The input load and the output load places a load on the gears 10 and these gears create a force against the ends of the carriers 16. If there were no bellows 28 and support 26, the gear carriers 16 could simply slide in the guideways 18 and 20 and the internal gear would remain stationary. However, the gear carriers 16 are restrained from sliding in the guideways by the bellows 28 and bellows support 26. To evenly load the gears 10, oil may flow from one of the bellows to another to equalize the load as shown in FIG. 3. The bellows are filled through connections 32—32 and such connections then are closed tightly to form a closed, leak-proof system.

FIG. 4 shows a design similar to FIGS. 1 and 2 except in this instance, the internal gear is stationary and the planetary gear assembly is fixed to and turns with the output shaft 46. The sun gear 34 is fixed to the input shaft 36 and the sun gear operates with the planetary gears 38 and the planetary gears 38 operate with the internal gear 40. Since the internal gear 40 is stationary in this design, when in operation, the planetary gears revolve on their own shafts 42 and are also carried around the sun gear 34. A circular guideway is cut into the face of the flange 44, the flange being fixed to the output shaft 46. Likewise a circular guideway is cut into the circular mating flange 48. A bellows support 50 is fixed between the flanges 44 and 48 in the circular guideway and the bellows 52 are attached to the supports 50.

These are two concentric, annular oil grooves 54 in the flange 48 and one of these oil grooves is connected to the forward set of bellows 52 while the other groove 54 is connected to the rear set of bellows through the holes 56. The oil grooves 54 are filled through the fittings 58 at assembly, which are then closed tightly to form a closed, leak-proof system.

In operation, the internal gear 40 is fixed and when the input shaft 36 is rotated, the planetary gears 38 rotate on their shafts 42 and also are carried around the sun gear 34. Similar to FIG. 2, the planetary gear carrier 60 bears against the bellows 52 and the bellows are fastened to the support 50. Since the support 50 is fixed to the flanges 44 and 48, these flanges and output shaft must turn when the input shaft rotates. The output shaft turns in the same direction as the input shaft but at a lower speed.

Thus, FIGS. 1 and 4 are similar except that, in FIG. 1, the internal gear 12 revolves to drive the output shaft, while in FIG. 4 the planetary gears are carried around the sun gear to drive the output shaft while internal gear 40 remains stationary. The housing 62 and cover 64 complete the structure.

Figure 19:
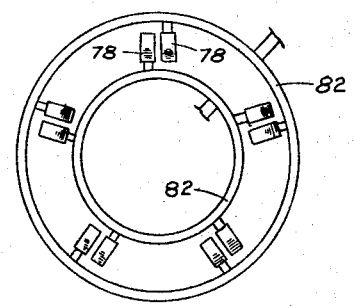
FIG. 19 is a diagrammatic view of the bellows and connections as used in the unit shown in FIGS. 14 and 15.
Figure 23:
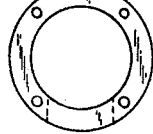
FIG. 23 is an end view of the thrust cage per se shown in FIG. 22.

FIG. 14 is a longitudinal sectional view through a device that is optional for use with the structures of FIGS. 1 and 4. The gearing and the input and output shafts of FIGS. 14-15 are similar to those in FIGS. 1 and 2. However, in this instance the gears 70 are mounted on eccentric shafts 72, the eccentric shafts being mounted in a stationary member and the eccentric shafts are controlled by hydraulic bellows to provide a small amount of rotation and thus change the gear centers slightly to provide even gear tooth loading. The operation is as follows:

The input shaft 66 carries the sun gear 68 and rotates therewith. The sun gear meshes with the gears 70 which, in turn, mesh with the internal gear 84. The gears 70 are mounted on the eccentric shafts 72 and the eccentric shafts are mounted in the stationary end wall 74. The eccentric shafts 72 have a control arm 76 which controls the rotation of the shafts. The control arm 76 is mounted between two bellows 78 and the bellows are mounted between two fixed supports 80. The bellows 78 are connected in positive and negative directional sets, as shown in FIG. 19, through the tubing 82. The internal gear 84 is attached to and concentric with the output shaft 86.

When in operation under load, should one or more gears receive more than their share of the load, then the load on the eccentric shafts 72 will also be unequal. This excess load on one gear will be reflected in an excess load on the control arm 76 and on one of the bellows 78. This excess pressure in one of the bellows will flow to the other bellows and increase their pressure to the average pressure in the system. Thus when one gear moves in a negative direction to release part of its load, one or more of the other gears are moved in a positive direction to increase their load and thus reach an equalization among the gears.

The eccentric shafts 72 have an offset central portion 92 which carries the gears 70 and this central portion is eccentric to the two end bearing portions 94 and 96, the two end portions being in axial alignment with each other. The amount of eccentricity, or offset, of the central portion 92 of the shafts in relation to the end portion is usually relatively small, or about one eighth inch, depending upon the size of the speed reducer. It is assumed such a unit can be made with reasonably accuracy and that it is not necessary to compensate for more than a few thousandths of an inch. With modern gear cutting equipment, the gears themselves should require very little movement for equalization.

Assuming the gears to be accurate and all the inaccuracies are in the associated parts, then there will be no continuous movement of the eccentric shafts after the gears become equally loaded. The gears themselves are relatively rigid and will deform very little under load. However, the shafting, housing and end wall will deflect under load due to stress, heat and vibration, and the eccentric shafts will compensate for this condition by a very slight rotation. As a further correction for uneven loading, self-aligning bearings should be used in all the planetary or outer gears. They are not shown however, to simplify the drawings. Also, antifriction bearings should preferably be used throughout the devices instead of the journal bearings or bushings, as shown. However, these details need not be shown to properly disclose the invention.

It will be noticed in FIGS. 14 and 15 that a full complement of outer gears may be used. Five are shown and the gear reduction is about 1 to 3.00. Should the reduction ratio be, for example, about 1 to 1.25, then eight or ten outer gears could be used as they would be much smaller. The greater the number of outer gears that are used, the greater the amount of power that can be transmitted. Also, the greater the number of outer gears being used, the greater the necessity for a simple and accurate equalization mechanism. The proposed devices are suitable for any number of gears that can be installed in the units.

In the foregoing embodiment, when one or more gears move in a negative manner to reduce their load, one or more of the other gears must move forward in a positive direction to increase their load. This situation would be easy to visualize if only two outer gears were used and they were mounted on opposite ends of a cross-arm similar to a walking beam. The center of the cross-arm would be attached to a floating member, such as 182 in FIG. 31. Such a mechanism would provide for improperly spaced outer gear shaft centers and also compensate for inaccurately cut gears. When more than two outer gears are used, the mechanism for equalization is not as simple as for two gears but the total results must be exactly the same; that is, as one or more gears move negatively out of overload, others must move forward in a positive direction into the load.

The bellows shown in FIGS. 14, 16 and 19 as stated before, are connected in positive and negative directional sets through the two sets of tubing 82. This provides for eqaulization under load in both directions. Only one set of bellows is necessary for one-way operation.

In actual practice either the driver or driven machine may have an uneven torque condition and the load may be of a pulsating nature. Thus the load on the gear teeth may shift from positive to negative quite often and sequenially when in operation. To function successfully, all equalization devices must be without undesired backlash under such conditions. All the devices in in this application provide for the removal of all backlash during reversal of tooth loading due to lost motion in the equalization mechanism. Also, this lost motion can be reduced to zero with the adjustments provided therein. All point and line contacts have been eleminated and replaced by area contacts throughout all the optional designs. These area contacts provide good bearing surfaces for long life without adjustment of any kind.

In the event some resilience is desired in the gearing, such resilience can be obtained by adding an expansion chamber 97 to the system, as shown in FIG. 3. The piston in the expansion chamber operates against a spring and compressed air. Also, two expansion chambers may be used to provide resilience in opposite directions. Since liquid is considered non-compressible, it is not necessary to use pressure in filling the bellows. Also, since the hydraulic systems are sealed, it is not necessary to re-fill them when in use and no oil pump, external or otherwise, is required as part of the gear devices.

Figure 20:
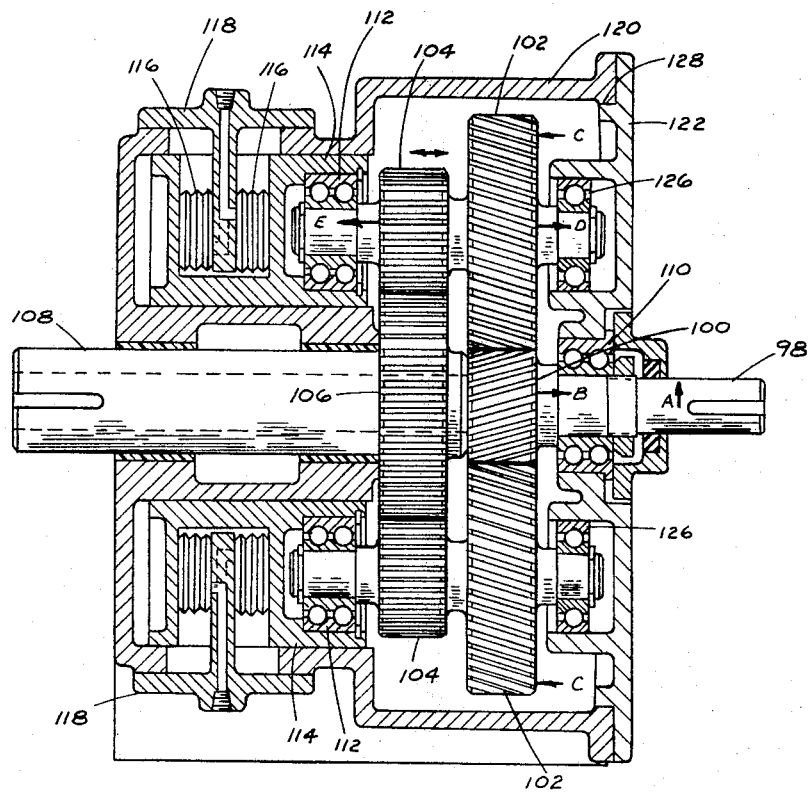
FIG. 20 is a longitudinal sectional view of another embodiment of gear unit taken through the axis thereof and showing compound gearing having no internal gear.

FIG. 20 is a longitudinal sectional view through an optional design of a compound gear speed reducer in which no internal gear is used but instead, compound gearing with two spur gears is used, the extra spur gear serving as the internal gear. In this design the outer gear centers do not shift or change centers to affect equalization. The operation is as follows: Power is applied at the input shaft 98 to which the small spur gear 100 is attached. The spur gear meshes with and operates the large gears 102 and the large gears are attached to and in axial alignment with the small gears 104. The small gears 104 mesh with and drive the large spur gear 106 and the large spur gear is attached to the output shaft 108. Thus, when the input shaft 98 is rotated, the output shaft 108 is rotated with increased torque in the same direction but a lower speed. It will be noticed that the teeth on gears 104 and 106 are straight or spur. The teeth on gears 100 and 102 are helical. When the input shaft 98 is operated under load in the direction of the arrow A, there will be axial thrust to the right as indicated by arrow B. This thrust is opposed by the thrust bearing 110.

The aforementioned thrust on the spur gear 100 is produced by the thrust of the gears 102, this thrust being in the opposite direction as shown by the arrows C. Thus, when in operation, under load, all the gears 102 will try to move axially as shown by arrow C. This axial load is carried by the thrust bearings 112 into the thrust cage 114 and the axial movement of the thrust cage 114 is controlled by the bellows 116. The bellows are connected in positive and negative direction, as shown in FIG. 3 and described relative to FIG. 19. Naturally, if the gears 102 and 104 were both straight tooth gears, or certain combinations of complementary helical gears, no change in tooth loading or "timing" will occur with axial movement. With the disclosed design, for example, if the gear 100 is held against rotation and the gear set 102 and 104 is moved axially, then the large gear 106 will rotate slightly.

As another example, assume the gears 100 and 106 are held stationary and also one set of the outer gears are held axially and against rotation; the spur gears are both locked. If a second set of gears 102 and 104 are rolled, in mesh, and in a planetary manner, partially around the two spur gears then this set of gears will move axially as they are being rolled. This axial movement is caused by the relical gears 100–102. In FIG. 20, again assuming the four lower gears all to be stationary, if the upper set of gears is rolled forward (toward the viewer) in mesh, then this set of gears 102 and 104 will move axially to the right as shown by arrow D. Also, if the same set of gears is rolled backward (away from the viewer) in mesh, then this set of gears will move axially to the left as arrow E.

Figure 22:
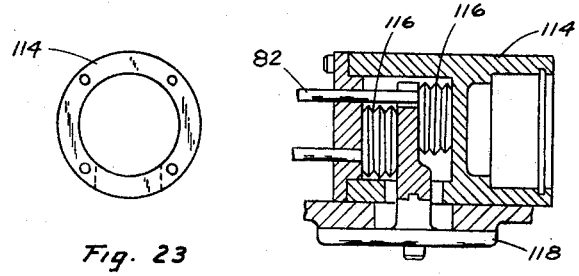
FIG. 22 is an optional design for the bellows layout of the unit shown in FIG. 20.

The gears 102 and 104 must be of different diameter to produce the desired results. All the gears in both gear trains may be helical but the helix angle of the two gear trains must be different so that an unbalanced axial thrust is produced in one certain direction for one direction of rotation and this axial thrust direction must be reversed when the direction of rotation is reversed. For example, the low speed gears 104 and 106 could have a very gentle helix angle and the high speed gears 100 and 102 could have a steep helix angle. If all the gears were spur gears, then they could not be rolled in a planetary manner with both sun gears stationary and would mesh only at certain specific locations. For an equivalent design with all spur gears, the gears and spacing would have to be extremely accurate for equal gear loading. Such accuracy is considered impractical to produce and maintain. When in operation under load, this type of compound gear sets produce an axial thrust because of the helical gears and by balancing this thrust the gear loading is also balanced without shifting the gear centers. An optional method of connecting the bellows 116 is shown in FIG. 22. The bellows and thrust cage 114 may be assembled as a unit.

Figure 21:
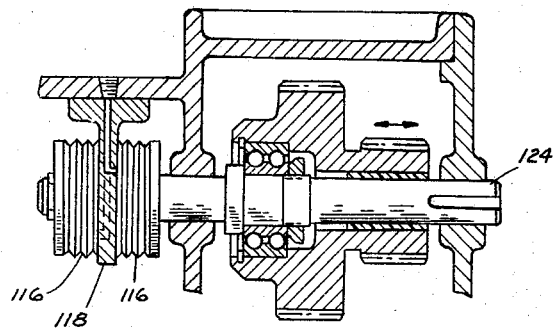
FIG. 21 is an optional design of the gear assembly of the unit shown in FIG. 20.

FIG. 21 shows another optional method of connecting the bellows in which a non-rotating shaft is used. This design eliminates the thrust cage 114 and is a generally simplified design. For reasons of simplicity the gears 102 and 104 are reversed from that shown in FIG. 20 but this is of no consequence to the invention. The bollows again are connected in positive and negative directional sets as shown in FIG. 3. A key is shown to prevent the planetary gear shaft 124 from rotating. In this FIG. 20, a thrust bearing 110 is shown on one end of the drive shaft 98 while the other end of the drive shaft is carried in the hollow output shaft 108. Naturally, the faces of the gears will not necessarily be even, as shown, when loaded equally. The axial thrust of the outer gears is carried into the thrust cage 114 and by the bellows 116 into the support 118 and the stationary housing. This support is drilled to deliver oil to the negative and positive bellows as shown. See FIG. 19 for the bellows connections.

The bellows 116 may be fixedly attached to the support 118 to prevent leakage and this assembly may be inserted into the thrust cage 114 after the remainder of the unit is assembled. The thrust cages 114 are round and free to slide, but not rotate in the bores of the housing 120. Because a double system of bellows is shown, this unit will operate in either direction. The radial bearings 126 are free to slide sideways in the housing end wall 122. The housing end wall is centered in the housing by the joint 128 which provides for precise alignment of the internal parts. The housing 120 and end wall 122 completes the enclosure of the operating parts. The gear centers do not shift in this design. Axial movement of the outer gears provide for perfect equalization.

With reference to helical gears, to render the specification and claims clear and simplify the description of operation thereof, reference to the "hand" of a helical gear means it may be right hand or left hand; that is, the helix may twist to the right or to the left. The amount of rate of twist is measured in degrees. A gear with 15° twist would be considered a gentle twist and a gear with 45° would be considered a steep twist. In FIG. 20, the large helical gear is right hand with a gentle helix of 15°. The gear 100 must be opposite and is left hand with a 15° helix angle. This explanation is intended to simplify some of the later description herein.

FIG. 24 is a longitudinal sectional view and shows another optional design somewhat similar to FIG. 20 in that it has compound gearing and is without an internal gear. However, the action of the equalization mechanism is different. In this design all gears must be helical. The operation is as follows:

The small inner spur gear 130 is attached to the input shaft 132 and meshes with the large outer gear 134, the large outer gear is fixed axially to the small outer gear 136, and this gear 136 meshes with the large spur gear 138 which is fixed to the output shaft 140, thus completing the gear train system.

The helix angle of the two gears 130 and 138 must be the same hand (left is shown) but not necessarily the same degree of twist or helix angle. Likewise, the helix angle of the two gears 134 and 136 must be the same hand (right is shown) but with the degree of twist complementary to the spur gear with which they mesh. When in operation, because of the helical gears, a thrust is applied to the input and output shafts which is controlled by the thrust bearings 142. Likewise, an equal thrust in opposite directions, is applied to the two gears 134 and 136. The hand of the helical gears 134 and 136 is similar (right hand is shown in FIG. 24) whereby, when the input power is applied to the one side of the teeth on large gear 134 and the opposite side of the teeth on the small gear 136, then the axial thrust of these two gears will be balanced, providing the helix angle of the gears is correct.

Since the gears 134 and 136 are fixed to each other, the aforementioned two opposing thrust loads are cancelled and there is no overall axial thrust on the gear sets. Thus each gear set will shift axially until the tooth loading on each gear is equal. The action is somewhat similar to a set of herringbone gears in which one of the gears is always free to float axially for even tooth loading. The foregoing arrangement is quite different however. In a herringbone gear each gear has two separate rows of teeth having opposite helix angles (one right and one left hand), while a set of the gears shown in FIG. 24 have teeth of the same helix angle (both being right or left hand). However, in a herringbone gear, the thrust is balanced because the loading is on the same side of the teeth on each half of the gear. In the design shown in FIG 24, the loading on one of the gears may be on the foreward side, while on the attached gear, the loading will be on the opposite side to produce an axial balance. Thus, in this instance, the helix angles must be the same hand. However, it is preferred that the degree of the helix angles on the two gear trains be not quite equal to provide equal thrust on the two gears 134 and 136. On the input gear train gears 130 and 134, the speed is higher and the tooth loading lower than on the output gear train 136 and 138. The difference in tooth loading and thrust can be compensated for by slightly changing the degree of the helix angles.

While there is theoretically no axial thrust on the gear sets, in practice, it would not be possible to exactly create and maintain such a condition. Thus, one set of outer gears, such as the lower set in FIG. 24, is held against axial movement by the washers 158. Otherwise, all the planetary gear sets would simply float endwise until they made contact with some stationary part of the housing or end wall. The end wall 154 is precisely located in the housing 152 by the housing joint 155.

In FIG. 24, the gearing itself will be self-balancing only if the gearing is produced very accurately. For example, if one set of outer gears were considerably undersize, or the teeth much thinner (see FIG. 77), then this set of gears could simply float and do no work. Axial movement would not compensate for such a condition. Axial float compensates only for inaccurate spacing of gear centers. In FIG. 24, the outer gears are shown mounted on eccentric shafts 144 which were described in connection with FIG. 14. Thus, if a set of outer gears floats to a balanced position and still carries more than its share of the load, then the pressure in its bellows 146 will be higher than in the remainder of the bellows and this excess pressure will flow to the lower pressure bellows to increase the load on the other gear or gears.

A description of the bellows and connections is included in the description of FIG. 14 above and need not be repeated here, except to indicate that the rotation of the eccentric shaft 144 is controlled by its control arm 148 which bears against the bellows 146 and the bellows bear against the supports 150 which are a part of the housing end wall 154. The housing 152, housing end wall 154 and end wall cover 156 complete the structure. The input shaft 132 and output shaft 140 each have a thrust bearing 142 and a radial bearing 160 for proper support, there being no hollow shaft in this optional design. The outer gears preferably are mounted on antifriction bearings, instead of bushings, as shown.

FIG. 25 is a fragmentary view on line 25—25 of FIG. 24 showing mounting details of the equalizing bellows 146. The bellows are mounted for two-way operation and the hydraulic connections are shown in FIG. 19.

FIGS. 26 and 27 are views of the eccentric shafts 144 and illustrates the side view and edge shapes of the control arm 148. The offset of the eccentric shaft is preferably outward as in FIG. 24 as its arc of rotation more nearly agress with the circle forming the planetary gear centers. Thus, its slight rotation will not affect the gear centers as much as if the offset was inward toward the main axis. This is an important discovery. The centers of all of the spur gears in each device together with the eccentric portions 92 of the eccentric shafts 72 upon which the gears 70 rotate are located on a circle 93 which is around and concentric with the sun gear 68. To provide an eccentric movement to the eccentric portion 92 and the gears, the centers of the end portions 94 and 96 may be inside or outside the circle 93.

If the centers of the end portions 94 and 96 are located inside the circle 93, as illustrated in FIG. 14A then any slight rotation of the shaft 72 will change the centers between the sun gear, internal gear and planetary gears the minimum amount, which is highly desirable. If the centers of the end portions are located outside the circle 93, as illustrated in FIG. 14B, then any slight rotation of the eccentric shaft 72 will change the gear centers the maximum amount.

FIG. 31 is a longitudinal sectional view of an optional design taken on line 31—31 of FIG. 32 and FIG. 32 is a cross-sectional view of the same device taken on line 32—32 of FIG. 31. This design is similar to FIGS. 1 and 2 except mechanical equalization is provided instead of the hydraulic system as in FIGS. 1 and 2. The gear operation is similar to that in FIGS. 1 and 2 and will be described briefly, as follows:

The input shaft 162 is fixed to the central inner gear 164 which is in mesh with the outer gears 166 and the outer gears are in mesh with the internal gear 168. The internal gear is attached to and concentric with the output shaft 170. The gears 166 are mounted on short shafts 172 and these shafts are mounted in the gear carriers 174. The carriers 174 are fitted into circular guideways formed in the end wall 176 and also in the circular support 178. The carriers 174 are restrained from turning by the drive pins 180, the drive pins being supported in a floating half of the gear coupling 182, see FIGS. 28 and 31. The internal part 184 of the gear coupling allows the coupling half 182 to float to provide balanced loading on the pins 180 and on the planetary gears. This design will not necessarily operate satisfactorily in an arrangement having more than three outer gears.

The pins 180 have flat sides, as shown in FIGS. 29, 30, 31 and 32, and driving shoes 186 are mounted between the carriers 174 and the pins 180 to provide for self-alignment and also to provide for full surface bearing areas. The sides of the pins 180 are flat and tapered and the shoes 186 are likewise tapered to provide for adjustment and wear. The nut 188 is used for adjusting the shoes. This mechanical design will produce exactly the same results as the hydraulic system shown in FIGS. 1 and 2. The equalization is accomplished by the shifting of mechanical components instead of liquid as in a hydraulic system. When one or more gears are overloaded, they can shift in a negative manner but this negative shifting also shifts one or more of the other gears in a positive manner into the load. Thus, as in a hydraulic system, it is not possible to load part of the gears without an equal load being applied to the other gears.

The foregoing is one of the important features of all the designs disclosed. When one or more of the gears shift in a negative direction to decrease their load, one or more of the other gears must shift in a positive direction to increase their load. The other half 190 of the coupling is fixed to the housing end wall such as by bolts 192.

FIG. 33 is a longitudinal sectional view of an optional design similar to FIGS. 14 and 15 except mechanical equalization is used instead of hydraulic means as in FIGS. 14 and 15. The gear operation is similar to that shown and described in FIGS. 14 and 15 and will be described very briefly, as follows:

The gear 194 is mounted on the input shaft 196 and the gear meshes with the gears 198. The gears mesh with the internal gear 200 which is connected to the output shaft 202. The gears 198 are mounted on eccentric shafts 204 and the eccentric shafts are mounted in the end wall 206 of the housing 208. The eccentric shafts 204 each have two control arms 214 as shown in FIGS. 36 and 39. One or more of these control arms may be adjustable, such as to compensate for wear, as shown in FIG. 39A. The two sets of wedges 210 in the general form of radial segments of a disc are mounted between the end wall 206 and the end cover 212, the wedges being mounted concentrically, in a planetary manner, around the input shaft 196. As shown in FIG. 34, these assembled wedges form a circle on their outside diameter and also form a central circular opening for the input shaft to pass through.

The control arms 214 are offset relative to each other. One of these control arms control one of the wedges in a certain set of wedges for rotation of the device in one specific direction of rotation, while the other control arm, which is offset in relation to the first control arm, controls one of the wedges in the second set of wedges, for the opposite direction of rotation. A suitable simple device, not shown, may be employed to prevent the wedges from rotating. Since these wedges are termed single acting, two sets are required for two-way operation of the device. A single set of wedges has been developed that will operate in both directions but they proved to be rather complicated and the double set of single acting wedges is preferred. However, the invention is not limited thereto.

Some kind of shoe or self-aligning device 216 may be used between the control arms and the wedges to provide self-alignment, provide area contact and reduce wear.

One or more of the shoes 216 may be selected, at the time of assembly, to be fitted so as to control the backlash, preferably to render it substantially zero. If necessary, because of wear, it may be replaced and the mechanism readjusted to establish the desired operative clearance without appreciable backlash. Alternatively, one of the control arms for each set of the wedges 210 may be provided with adjustable means such as illustrated in FIG. 39A.

The operation of the embodiment of FIG. 33 is the same as for the structure of FIG. 14, which uses hydraulic equalization. Any gear that is overloaded will press radially on its wedge and this movement will displace one or more of the other wedges radially in the opposite direction which will load the gear or gears interengaged therewith. This arrangement functions exactly like a hydraulic device except that, in this instance, metal is being displaced instead of a liquid. Inward movement of one or more wedges 210 will be balanced by an outward movement of one or more of the wedges of the same set. The wedges will fit perfectly when not displaced, as in FIG. 34, and will continue to fit evenly along radial lines when displaced as in FIG. 35.

It should be noticed that the wedges are not loaded and move freely unless all the gears are loaded. In this manner, equalization is truly equal and the balancing system is subjected to the absolute minimum of wear. During operation, should one or more gears become unloaded for any reason, all the wedges will move freely until this gear or gears is loaded again at which time the control arms 214 will press equally on all the wedges of one set and the wedges will form a rigid member not subject to further movement and all the gears will be fixed in their position until a difference in gear loading occurs again.

If the direction of rotation is reversed, then the above outlined procedure will occur on the second set of wedges. Should the load be a pulsating load of severe intensity, then the loading will continuously shift from one set of wedges to the other without backlash and fluctuations in speed. This is an extremely important advantage with these designs.

It may be necessary to provide one control arm for each set of wedges with an adjustment to remove clearances at assembly and for wear. FIGS. 49 and 50 show an example of such adjustment. The wedges preferably have flat faces as shown in FIGS. 33, 34 and 38. An end view of the eccentric shafts 204 is shown in FIGS. 39 for clarity. This is a very practical design for a mechanical equalization structure, while producing the same results as a hydraulic system. Such a system as shown is easy to manufacture accurately, has all area wearing surfaces and there is no possibility of leakage as in a hydraulic system. Further, it is easy to compensate for normal wear to eliminate backlash and adjustments can be provided to adjust for inaccurate machining of the various parts.

As stated above, there are two sets of wedges 210 having flat faces and they are mounted in a circular passage 218 formed by the flat surface 220 on the side of the end wall cover 212 and the flat surface 222 on the side of the end wall. This provides precise location for the wedges and allows them to operate freely in a radial direction only. As shown in FIG. 33, the end wall 206 has an integral axially extending wall 224 to support one end of the eccentric shafts 204 and provide precise alignment for the shafts.

Figure 40:
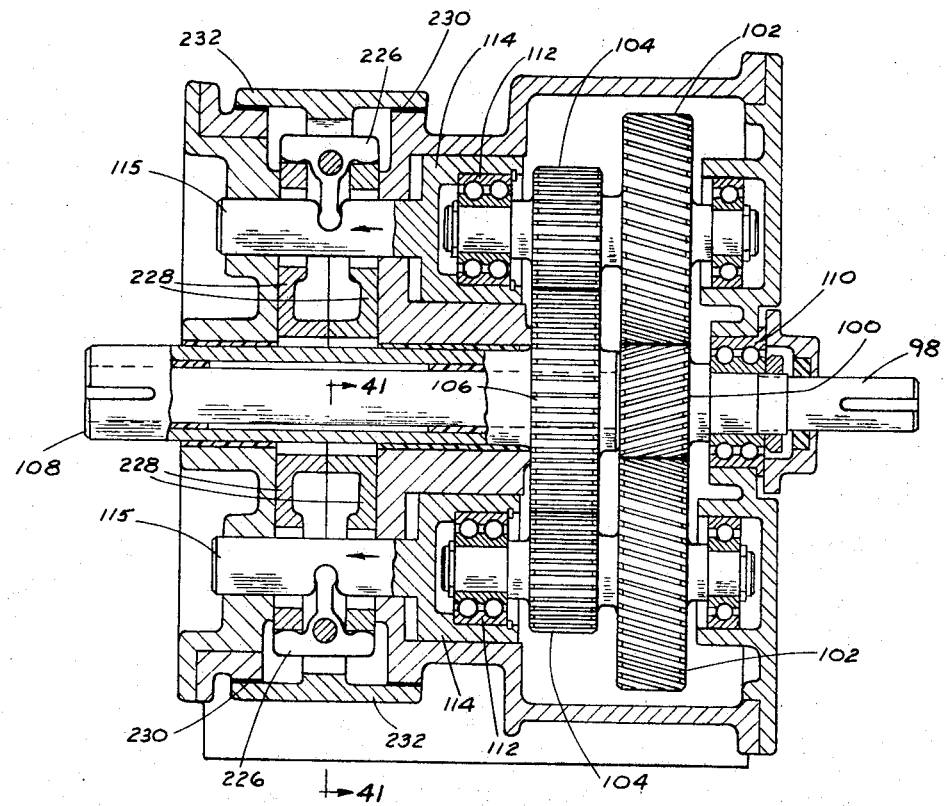
FIG. 40 is a longitudinal sectional view of still another embodiment of gear unit which is somewhat similar to that shown in FIG. 20 except that mechanical means is substituted for the hydraulic bellows shown in FIG. 20.

FIG. 40 is a longitudinal sectional view through another optional design in which the gearing is exactly similar to that in FIG. 20. However, mechanical balancing means is used in the design of FIG. 40 instead of hydraulic means as in FIG. 20.

The gears and shafting only are given the same reference numbers in FIG. 40 as used in FIG. 20 and the description regarding the gear action is exactly the same in both instances. Therefore, most of it is not repeated here relative to FIG. 40.

As in FIG. 20, when the design of FIG. 40 is operated under load, an axial thrust is produced on all the gear sets 102 and 104, the direction of thrust depending upon the direction of rotation of the input shaft 98. This thrust is carried into the thrust cage 114 through the thrust bearing 112. The axial movement of the thrust cage 114 is controlled by the two-way bell crank link 226. The bell crank movement is controlled by the wedges 228 and the action of the wedges is described in regard to the description of FIG. 33. Two sets of wedges are necessary for two-way operation. Adjustment is provided by the shims 230.

As in a hydraulic equalization system, when a gear moves in a negative direction to decrease its load, one or more of the other gears must move in a positive direction to increase their load. This does not occur in most other existing systems and especially where some type of flexible member is used. In all the systems utilizing flexible members, the overloaded gear simply moves in a negative manner until its load is reduced. The other gear or gears do not move in a positive manner to increase their load. In fact, when flexible members are used, all gears will move backward in a negative manner, the overloaded gear will simply move more, negatively, then the underloaded gears. Such a system cannot be made without backlash or "lost motion" and the gear load can never be exactly equal.

In all the designs and embodiments disclosed herein, there need be no backlash, or lost motion, except what is actually between the gear teeth. Further, most of these disclosures show designs where the gears can actually be pre-loaded and there will be zero backlash even with loose fitting gears or gears of different tooth thickness. As the gears wear, this clearance can always be readjusted to zero.

Figure 43:
FIG. 43 is a plan view showing the optional concave seats for the spherical self adjusting shoes.
Figure 42:
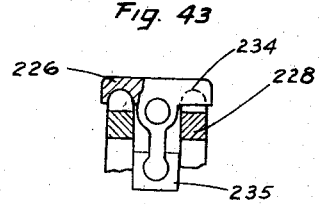
FIG. 42 is an optional design of the double acting bell crank for the unit shown in FIG. 40.
Figure 41:
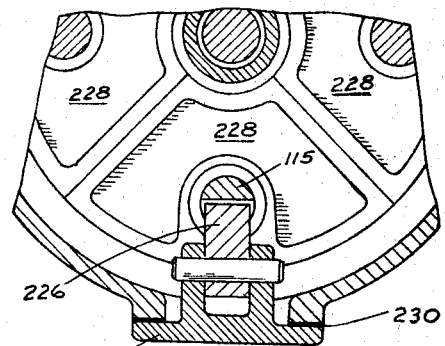
FIG. 41 is a fragmentary cross-sectional view taken on line 41—41 of FIG. 40.

FIGS. 42 and 43 show a spherical ended shoe 234 for self-alignment of the bell crank 226 on the outside diameter of the wedges 228. A swivel block 235 is also shown. This provides all-area wearing surfaces and adjustable shims 230 are provided to eliminate backlash. In FIG. 40, shoes 234 and swivel block 235 have been omitted, however, to simplify the drawings. The bell crank 226 and its support 232 may be assembled and installed as a unit, as shown in FIG. 41.

All the gear sets 102 and 104 produce an axial thrust, in the same direction, when in operation, and the balancing of this axial thrust also balances the gear tooth loads. For example, in FIG. 40, if the thrust on the gears is directed toward the left, as shown by the arrows, the bell cranks 226 will apply pressure to all the right hand set of wedges 228. These wedges will shift as shown in FIGS. 34 and 35 until the load is equal on all of this particular set of wedges and thus the tooth load on all the planetary gears would be equal. It should be noticed that all the wedges move freely and easily in adjusting themselves as there can be no load on their sliding surfaces until they are all loaded and, when they are all loaded equally, there is no need for further movement. Also, the amount of necessary movement will usually be a very few thousandths of an inch to provide equalization. Thus all parts must be rigid with no compressible material.

FIG. 46 is a longitudinal sectional view through another optional design similar to that in FIG. 14, but FIG. 46 has a mechanical equalization system instead of a hydraulic system as in FIG. 14. However, the gear and shaft arrangements are similar. The gear 242 is attached to the input shaft 244 and meshes with the gears 246. The gears are in mesh with the internal gear 248. The internal gear is connected to and drives the output shaft 250. The gears 246 are mounted on eccentric shafts 252 and the eccentric shafts are mounted in the housing end wall 254. The eccentric shafts 252 each have a single control arm 256 and these control arms 256 are attached to short connector links 258 which are attached to a circuit of floating links 260 as shown in FIG. 47. The links operate exactly like the hydraulic layout in FIG. 71. Hence, when a gear is overloaded, it will push a connector 258 and this moves the joint 262 of two of the links 260 inwardly to decrease its load. This will cause one or more of the other joints 262 to move outwardly and thus cause the underloaded gears to move into the load.

Any one, or combination of links 260 can be moved inwardly, for example, and will move one or more of the other links out for equalization. The control arms 256 being the same length, the tooth load of all the gears will be equal. To prevent the connected links 260 from moving out of position, one of the connectors 258 may be made integral with the control arm as in FIGS. 49 and 50. Adjustment preferably is provided to eliminate lost motion, as shown also in FIGS. 49–50.

Such a single system of links will allow the device to operate in either direction in the same manner as the double acting hydraulic system shown in FIG. 71. If an odd number of outer gears are used, then an offset link as in FIG. 51 is necessary. It has been proven experimentally that the link system shown in FIG. 47 will operate correctly with from three to six gears and possibly more. Negative movement in one or more of the gears will be transferred to one or more of the other gears, as positive movement, until the load becomes balanced. For example, if a certain gear is overloaded, the opposite gear is under-loaded and the in-between gears are properly loaded, then the overloaded gear will transfer its overload to the opposite side and the underloaded gear without moving the in-between and properly loaded gears. This effect is produced because the circuit of links 260 are free to float and also to flex at any of the hinge joints 262.

The joints 262 will not necessarily form a perfect circle, as shown, when in operation and will not necessarily be centered on the center of the input shaft 244.

In a device where the equivalent of the links 260 form a rigid circle or a rigid ring, the required results cannot be produced for a system of more than three planetary or outer gears. In a hydraulic device as in FIG. 71, liquid is transferred from the point or points of high pressure to the point or points of low pressure until the pressure is equal at all points. In this design the required motion is produced by the transfer of metal, the metal being free to float in any direction until the resistance is equal. This design works equally well in either direction of rotation with a single system of links as shown. The housing 264 and the end cover 266 complete the structure. The end wall 254 is centered in the housing 264 by the joint 268 for precise best location of the internal parts. Since the bores 270 and 272 for the eccentric shaft 252 are in axial alignment and in the one piece end wall, precision of manufacture is practical.

FIG. 52 is a longitudinal sectional view through another optional design. It is similar in operation to the mechanism shown in FIG. 20 but is different in some features. It has compound gearing as in FIG. 20 but uses one central spur gear and an internal gear instead of two spur gears as in FIG. 20. Also, a mechanical system is used for equalization instead of the hydraulic system used in FIG. 20. The action of the gears is as described in connection with FIG. 20 and will not be repeated except as necessary because of the different details of design.

The gear 274 is fixed to the input shaft 276 and this sun gear meshes with the large gears 278. The large gears 278 are fixed in axial alignment to the small gears 280 and these small gears mesh with and drive the interval gear 282. As shown in FIG. 52 the gear 274 and large gears 278 are helical, while the small gears 280 and internal gear 282 are straight or "spur" gears. Thus, when loaded and in operation, the helical gears will produce an axial thrust as described in FIG. 20. This thrust is carried through the thrust bearings 284 and into the thrust cage 286. The axial movement of the thrust cage 286 is controlled by the bell crank 288 and the movement of the bell crank is controlled by the system of links 290. A self-aligning joint 292 is provided to connect the bell crank 288 to the system of links 290. The bell crank 288 is pivoted in the arms of the support 294.

Figures 44, 45:
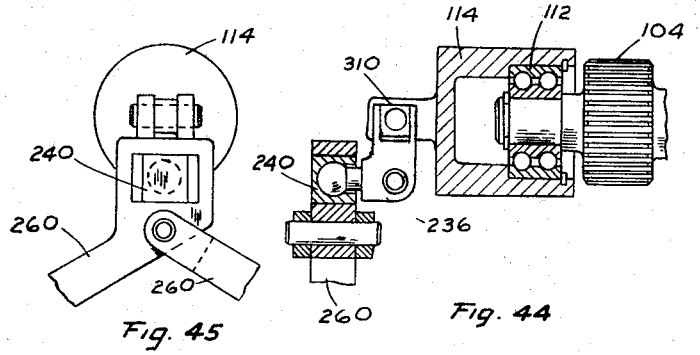
FIG. 44 is a fragmentary sectional view of an optional embodiment of means to connect the linkage equalization system to the planetary gear shafts of the embodiment of gear unit shown in FIG. 52.
FIG. 45 is a fragmentary end view of the mechanism shown in FIG. 44.

The links 290 operate in a circular guideway formed between a flange on the housing 296 and the end cover 298. The action of the links is as described in relation to FIG. 46 and need not be repeated for FIG. 52. A side view of the connected links is shown in FIG. 53 and a cross-section through the links is shown in FIG. 54. Detailed views of the self-aligning joint 292 and the bell crank 288 are shown in FIGS. 55–57. The re-entrant end wall 300 forms a self-aligning support for one end of the planetary gear shafts 302 and the cover 304 completes the structure. The internal gear 282 is fixed to a flange on the output shaft 306 and is concentric therewith. FIGS. 44 and 45 show a slightly different construction of the bell crank 236 and link connections as optional for the design shown in FIGS. 52, 55, 56 and 57.

Figure 58:
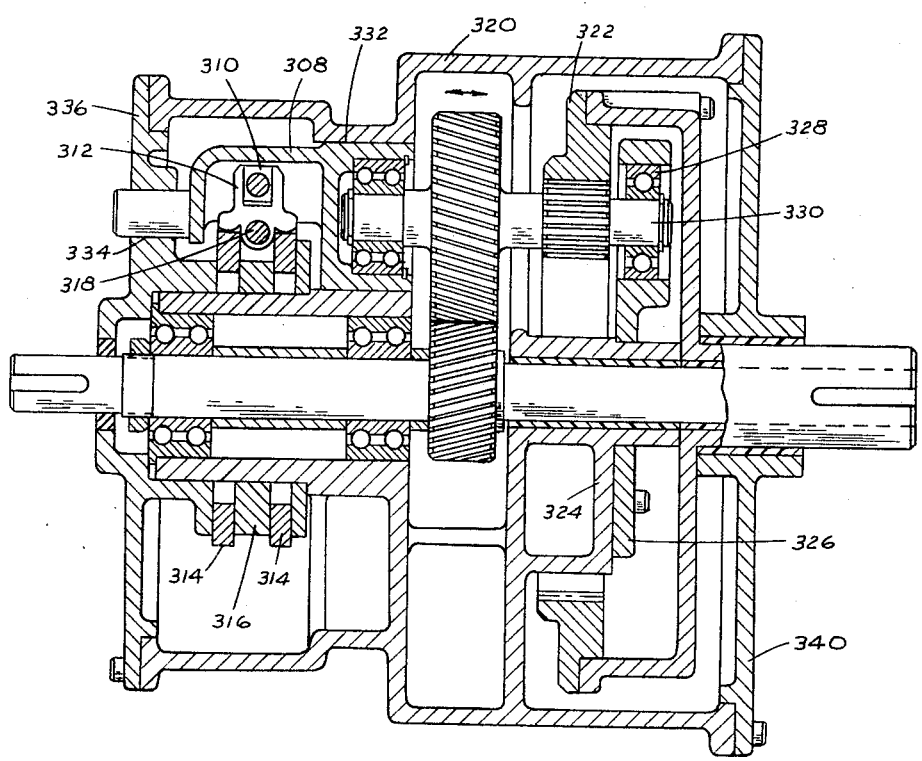
FIG. 58 is a longitudinal sectional view through a further embodiment of gear unit which is somewhat similar to that shown in FIG. 52 except that a double set of one-way linkages is used to control load equalization.

FIG. 58 is a longitudinal sectional view through another optional design which is similar to FIG. 52.

Axial thrust is produced by the helical gears when in operation, the same as in regard to the structure of FIG. 52. This thrust is controlled by the thrust cage 308. The thrust cage carries a hinged swivel block 310 and this swivel block operates in a slot in the pivoted double acting bell crank 312. The opposite ends of the double bell crank operate against the outside diameters of two sets of equalizing links 314. Since these links 314 are not connected at their joints by a pin, two sets of links are required for two-way operation. Since the links are always under compression, no pins are required at the joints. A spacer ring 316 is placed between the two sets of equalizing links 314. The pin 318 on which the bell crank 312 operates has its ends mounted in the housing 320.

Figure 61:
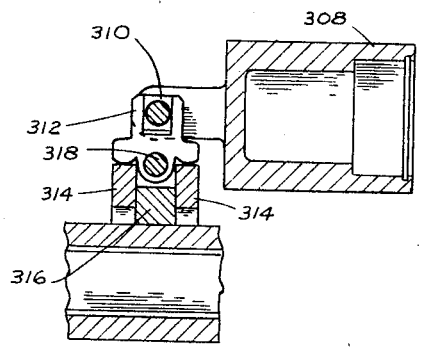
FIG. 61 is an optional design of the linkage and linkage control means for the unit shown in FIG. 58.
Figures 59, 60:
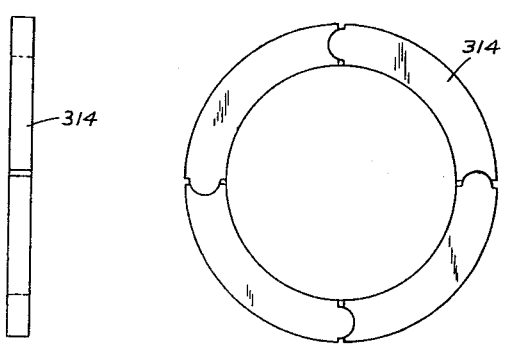
FIG. 59 is a side view of one of the sets of links shown in FIG. 58.
FIG. 60 is an edge view of a set of the links shown in FIG. 59.

When a set of outer gears move axially, the bell crank 312 will move a link of one set of links inwardly. The movement of one link inwardly will move one or more of the other of the same set of links outwardly for equalization. These links operate the same as those described in FIG. 46 except they are always under compression and each set operates for one direction of rotation only. The bell cranks 312 in the embodiment of FIGS. 58-61 normally are fitted with self-aligning shoes, as in the structures shown in FIGS. 42 and 43. The fixed shaft 318 may have its center portion, upon which part of the bell crank is mounted, slightly eccentric relative to its end portions, to provide for the adjustment of the bell cranks, shoes and wedges to eliminate backlash and provide adjustment for wear. To simplify the illustration, the eccentricity of the shaft 318 and the self-aligning shoes are not shown in FIGS. 58 and 61. FIG. 59 shows a side view of one set of said links. FIG. 60 is an edge view of one of said links. FIG. 61 is a fragmentary sectional view of a simplified design of the thrust cage that can be used where space permits.

It is believed that the double set of single-acting links shown in FIG. 58 may be more practical than the single set of double-acting links shown in FIGS. 46 and 52. In FIG. 58, a greater reduction in speed ratio is provided by a change in the internal gear 322 and its mounting. Also space is provided for a larger bearing 328 on the end of the planetary gear shaft.

It is to be understood that the hydraulic system as applied in FIG. 20 could also be applied to the design in FIG. 52 and the results would be the same. That is, as one or more of the gears moved in a negative direction to reduce their load, one or more of the other gears will be moved in a positive direction to increase their load and produce equalization. The housing 320 is provided with an inner wall 324 to which is fixedly attached a bearing plate 326, this bearing plate receiving and supporting the bearings 328 for one end of the gear shafts 330. The thrust cage 308 in FIG. 58 is supported in the the housing bore 232 and also in a bore 334 of the end wall 336. This construction provides for proper support and free movement of the thrust cage 308. The housing cover 340 completes the structure.

Figure 62:
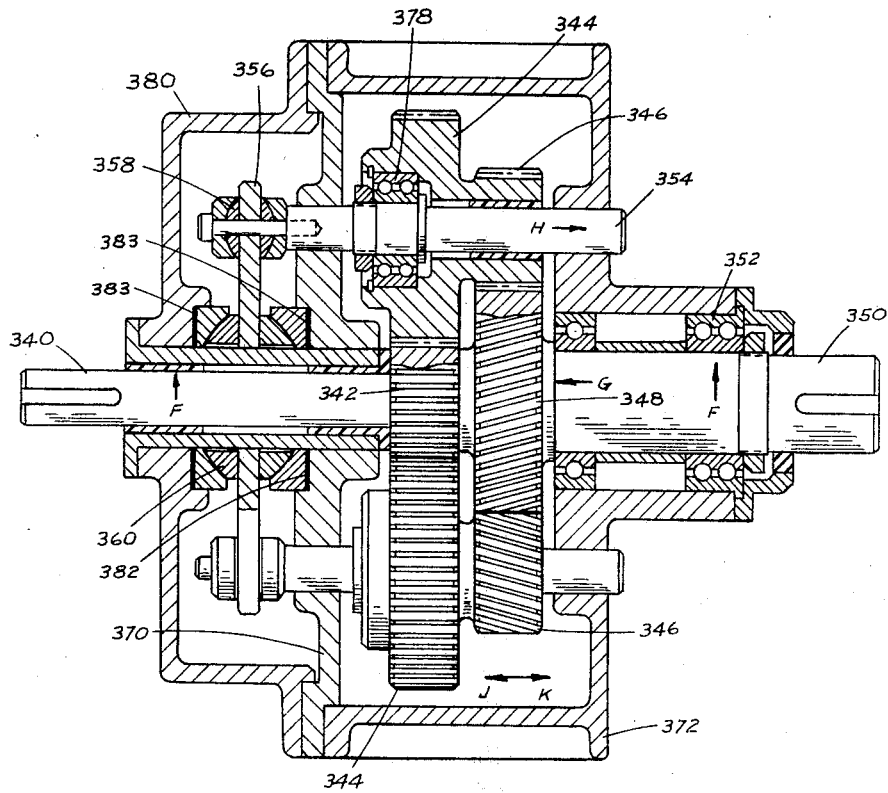
FIG. 62 is a longitudinal sectional view through another embodiment of gear unit somewhat similar to that shown in FIG. 40 except that a wobble plate is used to provide load equalization when three outer gears are used.

FIG. 62 is a longitudinal sectional view of another optional design having gearing very similar to that shown in FIG. 20 but in FIG. 62, a mechanical means of equalization is used, instead of a hydraulic system as in FIG. 20, to produce the same results. The input shaft 340 has the small spur gear 342 attached thereto which meshes with the larger outer gears 344. The larger outer gear is attached axially to the small outer gear 346 which meshes with the large gear 348 which is fixed to the output shaft 350. As shown, the high speed gear train 342 and 344 has straight or spur gear teeth, while the low speed gear train 346 and 348 has helical gears with spiral teeth. Thus, when in operation and loaded, there will be an axial thrust on the large gear 348 and small gears 346. The straight tooth gears 342 and 344 will produce no thrust. When the input shaft 340 and output shaft 350 are operating in the direction of the arrows F, there will be a thrust applied to the large sun gear 348 in the direction of the arrow G. This thrust is applied by the gears 346 and they produce an opposite thrust in the direction of arrow H.

Assuming a pair of outer gears 344 and 346 are not supported on a shaft and are meshed with stationary gears 342 and 348 and these outer gears are rolled forward or toward the viewer, they would also move axially in the direction of arrow J and if rolled backward, away from the viewer, they would move axially in the direction of arrow K. As explained above, both trains of gears can be helical if the helix angles are such that they create an axial thrust when operated. This axial thrust of the gears is applied axially to the gear shafts 354 and these non-rotating shafts are connected to a wobble plate 356 through the self-aligning bearing 358. The wobble plate is mounted in a self-aligning bearing 360 at its center in order that it can wobble in any direction and thus exactly balance the gear loads. This is exactly the same result as is accomplished with the hydraulic system shown in FIGS. 20 and 72. If one gear is overloaded it moves in a negative direction to reduce its load and this movement moves one or more of the other outer gears in a positive direction into the load. One gear cannot be loaded without all the gears being loaded. Shims 383 provide suitable adjustment.

Figure 63:
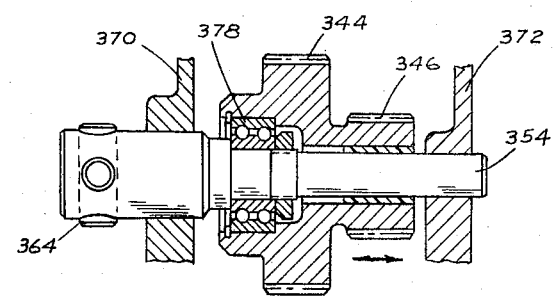
FIG. 63 is an optional design of an outer gear shaft which may be used with the structures illustrated in FIGS. 64—66.

FIGS. 63 shows an optional design of a self-aligning connection to control the planetary gear shaft 354. This connection 364 is in the form of a common universal joint and swivels in all directions and provides sliding motion in all directions. This universal joint connection 364 is shown more clearly in FIGS. 64–66. It is necessary to provide a joint that has movement in all directions, is easy to produce and has liberal wearing surfaces.

Figure 64:
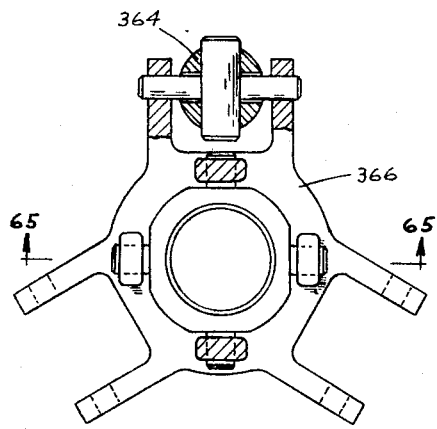
FIG. 64 is an optional design of an outer gear actuating member which may be substituted for the wobble plate shown in FIG. 62.
Figure 65:
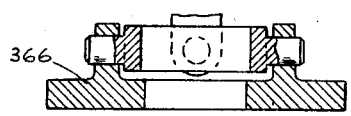
FIG. 65 is a section through the member shown in FIG. 64 taken on the line 65—65 thereof.

A substitute for the wobble plate 356 is shown in FIG. 64. This wobble plate 366 has double hinged joints at its center and at each of its three arm tips for universal movement. FIG. 65 is a section through FIG. 64 on line 65—65.

Figure 66:
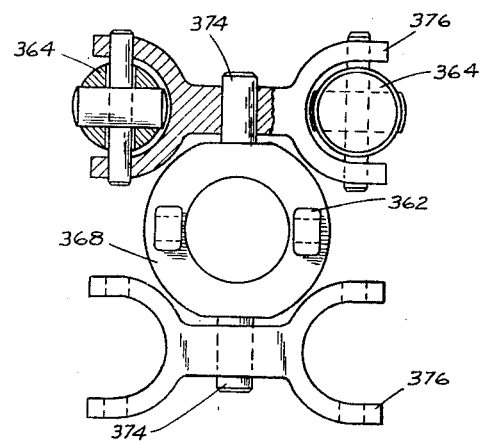
FIG. 66 is a side view of still another structure which may be used instead of the wobble plate shown in FIG. 62 when four gears are used.

FIG. 66 shows a universal joint mounting for four gears. The central balancing lever 368 is mounted centrally over the input shaft similar to the wobble plate 356 in FIG. 62. It is hinged to the housing end wall 370 by the extended bosses 362. Each end of this balancing lever 368 has axially aligned trunnions 374 and balancing levers 376 are rotatably supported on these trunnions. Each of the balancing levers 376 have both of their ends forked to receive the self-aligning connection 364. Thus, with the arrangement shown in FIG. 66, each of the four gear shafts 354 is free to move axially in any amount necessary to provide exact equalization with true freedom and without binding at any of the joints.

Figure 67:
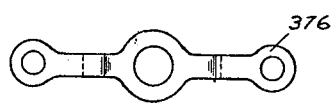
FIG. 67 is an edge view of one of the balancing levers included in the structure shown in FIG. 66.
Figure 68:
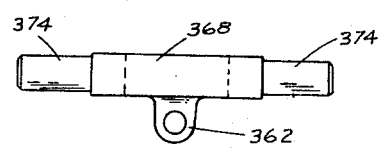
FIG. 68 is an edge view of the center balancing member of FIG. 66.

FIG. 67 is a side view of the balancing levers 376 and FIG. 68 is a side view of the central balancing lever 368. FIGS. 64 and 66 illustrate thoroughly practical means of balancing the thrust on the gear shafts between there is no lost motion, no sliding surfaces and no line contacts to wear. All the bearings and other parts can be made as large as necessary to produce satisfactory service.

These arrangements also operate similarly to the hydraulic systems disclosed hereinabove in that in FIG. 62, metal is displaced instead of liquid. If one gear is overloaded, it moves in a negative direction and displaces metal in a positive direction to move one or more of the other gears in a positive direction and into the load. The thrust of the output shaft 350 is carried by the thrust bearing 352 and applied to the housing 372. The thrust of the planetary gear shafts is transferred by the thrust bearings 378 to the non-rotating shafts 354. The end cover 380 provides a seat for one side of the self-aligning bearing 360, the other seat 382 being in the housing end wall 370. Shims 383 provide for adjustment.

FIG. 69 is a longitudinal sectional view of another optional design which has the same gearing arrangement as shown in FIG. 24. In FIG. 24, a hydraulic balancing system is used to compensate for gears of uneven size and the outer gears may shift axially to compensate for unequal gear spacing but the compensating system for uneven gears is eliminated in the optional design of FIG. 69, which provides only for incorrect gear spacing. It is generally believed that modern machinery can cut gears very accurately, whereby the tooth thickness will be accurate within a few ten thousandths of an inch. Thus, no equalization is needed for the gear themselves. Further, they generally wear equally, do not distort under load and improve in operation when in service. Thus, when it is not necessary to compensate for unequal gears, the design may be substantially simplified, due to the gears balancing themselves. This is believed to be a marked advance in the art. Axial balancing of helical gears appears to be the most practical method of all described and shown herein to achieve the desired results. It is not possible, however, to make the housing and associated parts with the accuracy of good gears and considerable distortion may occur in operation. Accordingly, FIG. 69 discloses a simple method to balance the gear loads on accurately cut gears without changing the gear centers or resorting to any type of separate balancing means, hydraulic or mechanical. The input shaft 384 has the small spur gear 386 fixed thereto and this spur gear meshes with the larger outer gears 388 and the large outer gears are axially attached to the small outer gears 390. The small outer gears mesh with and operate the large gear 392 and the large sun gear is fixed to the output shaft 394.

In operation, a thrust is produced on the small gear 386 because of the helical gear teeth. This thrust is sustained by the thrust bearing 396. The thrust on the gear 386 is produced by the gear 388 but the thrust of the gear 388 is balanced by the opposing thrust of the small helical gear 390. Thus, there is no axial thrust on the gear shaft 398. The thrust of the gears 390 is produced by the large gear 392 and this thrust is sustained by the thrust bearing 400. If desired, this thrust load on bearings 400 and 396 could be eliminated by placing a thrust bearing directly between the gear 386 and gear 392.

The design shown in FIG. 69 is preferred due to being less complicated than the preceding embodiments or designs. The helix angle of the teeth on the outer gears must be the same hand (right or left) and the helix angle of the two spur gears must also be the same hand but opposite to that of the outer gears, the gears being complementary. One set of outer gears will always mesh with the two spur gears as one of the spur gears can turn slightly to allow meshing and also keeping the gear faces in alignment.

With one set of outer gears in mesh with the two spur gears while these gears are held against rotation, another set of outer gears may not mesh in some specific place, such as exactly opposite, without moving the second set axially to dispose the faces out of alignment. In this situation, the second set of gears may be rolled upon the stationary spur gears in a planetary manner until the faces are in alignment. For example, with one set of outer gears in mesh with the spur gears and these gears are fixed against rotation, if another set of outer gears is meshed and rolled forward, in a planetary manner, upon the spur gears, toward the viewer, the outer gears will move axially to the left as shown by the arrow M and if rolled backward, away from the viewer, these same gears will move to the right as shown by the arrow N, assuming the outer gears are right hand and the spur gears are left hand as shown in FIG. 69.

This axial movement, when rolling the outer gears upon stationary spur gears, is caused by the difference in the diameter of the gears 388 and 390. If they were the same size, they would not shift axially when rolled upon spur gears of equal size. It is this axial movement that allows the gears to automatically balance themselves even when the gear centers are not spaced accurately. It is to be understood that the faces of the gears will not necessarily be in alignment when the gears balance themselves. In FIG. 69, the lower set only of the outer gears is held against axial movement. Since it is impossible to balance the gears perfectly, the gears would simply move axially entirely out of mesh if one set was not restrained. The lower set locates the spur gears so that all the other gear sets will move into a position where they will be loaded equally. Because the high speed gear train (left side in FIG. 69) has a lower tooth loading than the low speed gear train on the right side, it is preferred to have a different degree of helix angle, or twist, on the two gear trains. That is, the gears 386 and 388 would be somewhat different from gears 390 and 392 so that the axial thrust can be closely balanced.

As mentioned above, the design shown in FIG. 69 provides for equalization of incorrectly spaced outer gear centers. In such designs it is not practical to attempt to produce gears with substantially zero backlash. A relatively small amount of gear tooth clearance is usually acceptable and sometimes beneficial. However, if the backlash must be substantially zero, the optional designs shown in FIGS. 69A and 70A may be used. As shown in FIGS. 69 and 70 the lower set of gears is fixed against axial movement by the particular bearing mountings. With one set of gears located axially all other sets in the device will also be properly located axially because of the helical gear teeth and the difference in diameter of the two gears of each set of planetary gears. Any further backlash must be between the gear teeth only, which is very small.

To eliminate this last remaining clearance, the gear sets may have a bellows 28 mounted between the housing end cover 405 and the thrust plate 407, the thrust plate being mounted to carry the thrust to the thrust bearings on the shafts 398. The bellows 28 are connected together in a single set by the tubing 30. The bellows can be filled exactly to such extent and pressure that all end clearance is eliminated or the bellows can be filled under slight positive pressure to pre-load the gears against each other and, at the same time, balancing the load equally among all the gears.

The mechanical balancing feature shown in FIG. 70A can be used instead of the hydraulic feature shown in FIG. 69A, the equalizing means in FIG. 70A being a wobble plate, as shown in complete detail in FIG. 62. Clearance adjustment is made by the shims 383.

The balancing features shown in FIGS. 69A and 70A are shown separately and enlarged for clarity rather than include them in reduced scale illustration in FIGS. 69 and 70.

FIG. 70 shows an optical design of the embodiment shown in FIG. 69, in which one central spur gear and one internal gear are used instead of two spur gears as in FIG. 69. The gear action is substantially the same as in FIG. 69 however. It will be noticed the lower gear shaft is fixed against axial movement while the remainder of these gears are free to move axially, as in FIG. 69. The housing 403 and end wall 405 enclose the structure. The optional designs shown in FIGS. 69A and 70A can also be used with the devices shown in FIG. 70 in situations where self-equalization and substantially zero gear tooth clearance must be maintained.

FIG. 71 is a diagrammatic view of a hydraulic balancing device provided to illustrate a possible substitution for the mechanical link device shown in FIG. 47, the operation of both being similar. To avoid leakage and provide a sealed system, diaphragms can be used instead of the plungers 402 and the plunger rods 404 can be sealed by bellows or other leakproof means. The oil passageway 406 connects all the plungers into a complete system for one-way operation and the oil passageway 408 connects all the plungers for operation in the other direction.

FIG. 72 is a side view and FIG. 73 is a sectional view of a sealed hydraulic device to illustrate, or provide an alternative structure for use in lieu of the mechanical equalizing device shown in FIGS. 62, 64 and 66. When one of the non-rotating planetary gear shafts 410 moves axially in a negative direction in response to pressure on its diaphragm 412, to reduce a gear load, one or more of the other gear shafts 410 will be moved in a positive direction by the action of the other diaphragms 412 associated therewith. However, the preferred design is shown in FIGS. 62, 64 and 66.

FIGS. 74, 75 and 76 are views of a hydraulic balancing device provided as an alternative structure for the mechanical devices shown in FIGS. 33 and 40. Since the plungers 414 are single-acting, as well as the wedges they replace, two sets are required for two-way operation. The usual control arms 416 operate similarly to those shown in FIGS. 34, 35 and 36.

FIG. 77 shows how an undersize spur gear 418 can float between the sun gear 420 and the internal gear 422 and impose all the load on the full size spur gear 424. To load this gear the center may be shifted as shown by the arrow. This can be done by the use of the controlled eccentric shafts or by the design shown in FIG. 1. Also, all the designs which are shown with planetary or outer gears having equalizing axial control will compensate for undersize gears. This is a very important feature of all these devices. They compensate for inaccuracies of the gears and also for inaccurate gear spacing and housing distortion.

In this regard, it should be apparent that it is not practical or necessary to illustrate all the possible combinations of gear layouts and control means which are possible of embodying the principles of the present invention.

In FIG. 47, wherein links of fixed length are shown, it is also intended that endless cables could be used instead of the circular arrangement of pivoted links 260, whereby a generally circular arrangement of fixed length is provided in either construction. The connector links 258 are connected to the endless cable in such alternate construction in a manner to be the equivalent of the pivot pintles 262 for links 260. Two endless cables would be required under such circumstances and each eccentric shaft would be provided with two control arms as shown in FIG. 36. Cables could also be used with the embodiments shown in FIGS. 40 and 58 with only slight alterations which will be apparent to those skilled in the art. While such cables are flexible in a manner to provide equalization of the gears, they are not variable in the load carrying directions and are assumed to be of precise, desired fixed length.

While the invention has been described and illustrated in its several preferred embodiments, it should be understood that the invention is not to be limited to the precise details herein illustrated and described since the same may be carried out in other ways falling within the scope of the invention as claimed.

I claim:

1. A speed changing device comprising a housing, a driven shaft, a driving shaft, thrust bearing means for supporting said shafts to said housing for rotation about a common axis, a first gear mounted on one of said shafts, a second gear mounted on the other of said shafts, at least one of said first and said second gears having helical teeth, a plurality of compound spur gears spaced circumferentially about the axis of said shafts, bearing means for rotatably supporting said compound spur gears, said first and said second gears being in mesh with said compound spur gears so as to enable one of said gears to be driven from the other upon rotation of the driving shaft, and means for supporting at least one of said last named bearing means for axial movement.

2. A speed changing device set forth in claim 1 wherein each of said compound spur gears comprises two gears supported to a common shaft, each of said gears having a different diameter, one of said gears meshing with said first gear and the other of said gears meshing with said second gear, and said common shaft being rotatably supported in radial bearings at opposite ends thereof, one of said radial bearings being carried in an axially displaceable thrust cage, the other radial bearing being free to slide endwise in the endwalls of the housing.

3. A speed changing device as set forth in claim 1 wherein the other of said first and said second gears includes helical teeth, the helix angle of the teeth of said first gear being different from the helix angle of the teeth of said second gear.

4. A speed changing device as set forth in claim 1 wherein the other of said first and said second gears includes straight teeth.

5. A speed changing device as set forth in claim 1 including means for supporting each of said compound spur gears, said means comprising a rotatable shaft for each compound spur gear, each of said rotatable shafts being supported within said bearing means and arranged for axial movement together therewith to thereby effect axial movement of the corresponding compound spur gears.

6. A speed changing device as set forth in claim 5 further including hydraulic means operably connected to said rotatable shafts for axially displacing said shafts to equalize the load on said gears.

7. A speed changing device as set forth in claim 6 wherein said hydraulic means comprises a dual bellows system supported to the housing and operable to direct an axial force on said rotatable shafts in response to an unbalance in load on the compound spur gears.

8. A speed changing device as set forth in claim 7 wherein said dual bellows system is connected in positve and negative directional sets, each set including a plurality of commonly connected bellow members, a bellow member of each set forming a pair, one pair being associated with each spur gear.

9. A speed changing device as set forth in claim 1 wherein said bearing means for supporting each of said compound spur gears comprises a first and a second bearing, said compound spur gears each having a rotatable shaft, each of said rotatable shafts being supported at opposite ends in said first and said second bearings, a channel in one end of said housing adapted to slidingly receive said first bearings, a thrust cage for each shaft disposed at the other end of said housing, said second bearing being fixedly mounted in said thrust cage and means for axially displacing said thrust cage in response to an unbalance in the loading of said compound spur gears.

10. A speed changing device as set forth in claim 9 wherein said means for axially displacing said thrust cage comprises a force directing means for each thrust cage operable to displace said thrust cage in a first or a second axial direction in response to the direction of unbalance of the loading of the compound spur gears.

11. A speed changing device as set forth in claim 10 wherein said housing includes a plurality of bores spaced about the axis of the driving shaft for slidingly supporting said thrust cages.

12. A speed changing device as set forth in claim 1 wherein said means for supporting each of said compound spur gears comprises a non-rotatable shaft for each spur gear arranged for axial displacement along an axis parallel to the axis of the driving shaft.

13. A speed changing device as set forth in claim 12 further including hydraulic means operably connected to each non-rotatable shaft for axially displacing said shaft to compensate for an unbalance in load on the compound spur gears.

14. A speed changing device as set forth in claim 13 wherein said hydraulic means comprises a bellows system supported to the housing and operable to direct an axial force on said non-rotatable shafts in response to an unbalance in load on the compound spur gears.

15. A speed changing device as set forth in claim 14 wherein said bellows system is connected in positive and negative directional sets, each set including a plurality of commonly connected bellows members, a bellow member for each set forming a pair, one pair being associated with each compound spur gear.

16. A speed changing device comprising a housing, a driven shaft, a driving shaft, thrust bearing means for supporting said shafts to said housing for rotation about a common axis, a first gear mounted on one of said shafts, a second gear mounted on the other of said shafts, at least one of said first and said second gears having helical teeth, a plurality of compound spur gears spaced circumferentially about the axis of said shafts, said first and said second gears being in mesh with said compound spur gears so as to enable one of said gears to be driven from the other upon rotation of the driving shaft, means for supporting said compound spur gears, said means for supporting each of said compound spur gears comprising a rotatable shaft for each compound spur gear, each of said rotatable shafts being arranged for axial movement to thereby effect axial movement of the corresponding compound spur gears, and hydraulic means operably connected to said rotatable shafts for axially displacing said shafts to equalize the load on said gears, said hydraulic means comprising a dual bellows system supported to the housing and operable to direct an axial force on said rotatable shafts in response to an unbalance in load on the compound spur gears.

17. A speed changing device as set forth in claim 16 wherein said dual bellows system is connected in positive and negative directional sets, each set including a plurality of commonly connected bellow members, a bellow member of each set forming a pair, one pair being associated with each compound spur gear.

18. A speed changing device as set forth in claim 16 wherein said means for supporting each of said compound spur gears comprises a rotatable shaft for each planetary gear and a first and a second radial bearing, each of said rotatable shafts being supported at opposite ends in said bearings, a channel in one end of said housing adapted to slidingly receive said first bearing, a thrust cage for each shaft disposed at the other of said housing, said second bearing being fixedly mounted in said thrust cage and means for axially displacing said thrust cage in response to an unbalance in the loading of said compound spur gears.

19. A speed changing device as set forth in claim 18 wherein said means for axially displacing said thrust cage comprises a force directing means for each thrust cage operable to displace said thrust cage in a first or a second axial direction in response to the direction of unbalance of the loading of the compound spur gears.

20. A speed changing device as set forth in claim 19 wherein said housing includes a plurality of bores spaced about the axis of the driving shaft for slidingly supporting said thrust cages.

21. A speed changing device as set forth in claim 1 wherein said bearing means for supporting each of said compound spur gears comprises a non-rotatable shaft connected to each compound spur gear said non-rotatable shaft being arranged for axial displacement along an axis parallel to the axis of the driving shaft.

22. A speed changing device as set forth in claim 21 further including means for operably connecting said hydraulic means to each non-rotatable shaft for axially displacing said shaft to compensate for an unbalance in load on the compound spur gears.

23. A speed changing device as set forth in claim 22 including means for supporting said bellows system to the housing, said bellows system being operable to direct an axial force on said non-rotatable shafts in response to an unbalance in load on the compound spur gears.

24. A speed changing device as set forth in claim 23 wherein said bellows system is connected in positive and negative directional sets, each set including a plurality of commonly connected bellow members, a bellow member for each set forming a pair, one pair being associated with each compound spur gear.

References Cited

UNITED STATES PATENTS

| | | | |
|---|---|---|---|
| 1,586,309 | 5/1926 | Hult | 74—801 |
| 2,386,367 | 10/1945 | Taylor | 74—410 |
| 2,518,708 | 8/1950 | Moore | 74—410 |
| 2,764,903 | 10/1956 | Miller | 74—411 X |
| 2,863,324 | 12/1958 | Cain et al. | 74—410 |
| 2,899,822 | 8/1959 | Matthews | 74—410 X |
| 2,920,497 | 1/1960 | Wiken | 74—410 |
| 2,971,407 | 2/1961 | Katz | 74—801 |
| 3,292,460 | 12/1966 | Fritsch | 74—801 |

ARTHUR T. McKEON, Primary Examiner

U.S. Cl. X.R.

74—801